United States Patent
Palmer

(10) Patent No.: US 11,131,350 B1
(45) Date of Patent: Sep. 28, 2021

(54) POWER TRANSMITTING CLUTCH AND DISCONNECT

(71) Applicant: The Hilliard Corporation, Elmira, NY (US)

(72) Inventor: James E. Palmer, Elmira Heights, NY (US)

(73) Assignee: The Hilliard Corporation, Elmira, NY (US)

( * ) Notice: Subject to any disclaimer, the term of this patent is extended or adjusted under 35 U.S.C. 154(b) by 0 days.

(21) Appl. No.: 16/903,577

(22) Filed: Jun. 17, 2020

(51) Int. Cl.
  *F16H 1/32* (2006.01)
  *H02K 7/108* (2006.01)
  *F16D 41/08* (2006.01)
  *F16D 27/105* (2006.01)

(52) U.S. Cl.
  CPC ......... *F16D 41/088* (2013.01); *F16D 27/105* (2013.01)

(58) Field of Classification Search
  CPC ................. F16D 27/10–115; F16D 41/08–105
  See application file for complete search history.

(56) References Cited

U.S. PATENT DOCUMENTS

| | | | |
|---|---|---|---|
| RE38,012 E | 3/2003 | Ochab et al. | |
| 6,622,837 B2 | 9/2003 | Ochab et al. | |
| 6,629,590 B2 | 10/2003 | Ochab et al. | |
| 6,722,484 B2 | 4/2004 | Ochab et al. | |
| 7,591,355 B2 | 9/2009 | Hamrin et al. | |
| 7,849,988 B2 | 12/2010 | Suzuki et al. | |
| 8,641,575 B2 | 2/2014 | Kokubo | |
| 8,857,294 B2 | 10/2014 | Brewer et al. | |
| 8,857,589 B2 | 10/2014 | Heath et al. | |
| 2002/0134634 A1* | 9/2002 | Ito | F16D 27/10 192/35 |
| 2003/0178237 A1* | 9/2003 | Terada | F16D 27/10 180/249 |
| 2007/0286743 A1* | 12/2007 | Ochab | F16D 41/088 417/313 |

(Continued)

*Primary Examiner* — Charles A Fox
*Assistant Examiner* — Farhana Pervin
(74) *Attorney, Agent, or Firm* — Faegre Drinker Biddle & Reath LLP

(57) ABSTRACT

A coupling for connecting an input shaft to an output shaft through a bi-directional overrunning clutch assembly. A portion of the input shaft is located within an internal cavity of the output shaft. The bi-directional roller clutch assembly selectively connects and disconnects the input and output shafts from one another. A drive plate is disposed about and attached to a portion of the input shaft so as to rotate in combination therewith. The drive plate is rotationally connected to a clutch housing of the clutch assembly such that rotation of the input shaft produces corresponding rotation of the clutch housing. A torsion spring is positioned within a spring retainer and engaged with at least one of either the spring retainer or the clutch housing. An engagement control assembly controls the engagement and disengagement of the clutch assembly and a coil housing mounted in the cover and a coil mounted in the coil housing, the coil is connected to a switch for controlling the supply of current to the coil. The coil having an active state for generating magnetic flux when power is sent to the coil, and an inactive state when no power is sent to the coil and no magnetic flux is generated. At least one armature plate is disposed about the output shaft and positioned near the coil.

19 Claims, 14 Drawing Sheets

(56) References Cited

U.S. PATENT DOCUMENTS

2013/0299298 A1\* 11/2013 Akiyoshi .............. F16D 41/105
　　　　　　　　　　　　　　　　　　　　　192/71
2015/0159743 A1\* 6/2015 Palmer ................... F16D 47/04
　　　　　　　　　　　　　　　　　　　　　74/650

\* cited by examiner

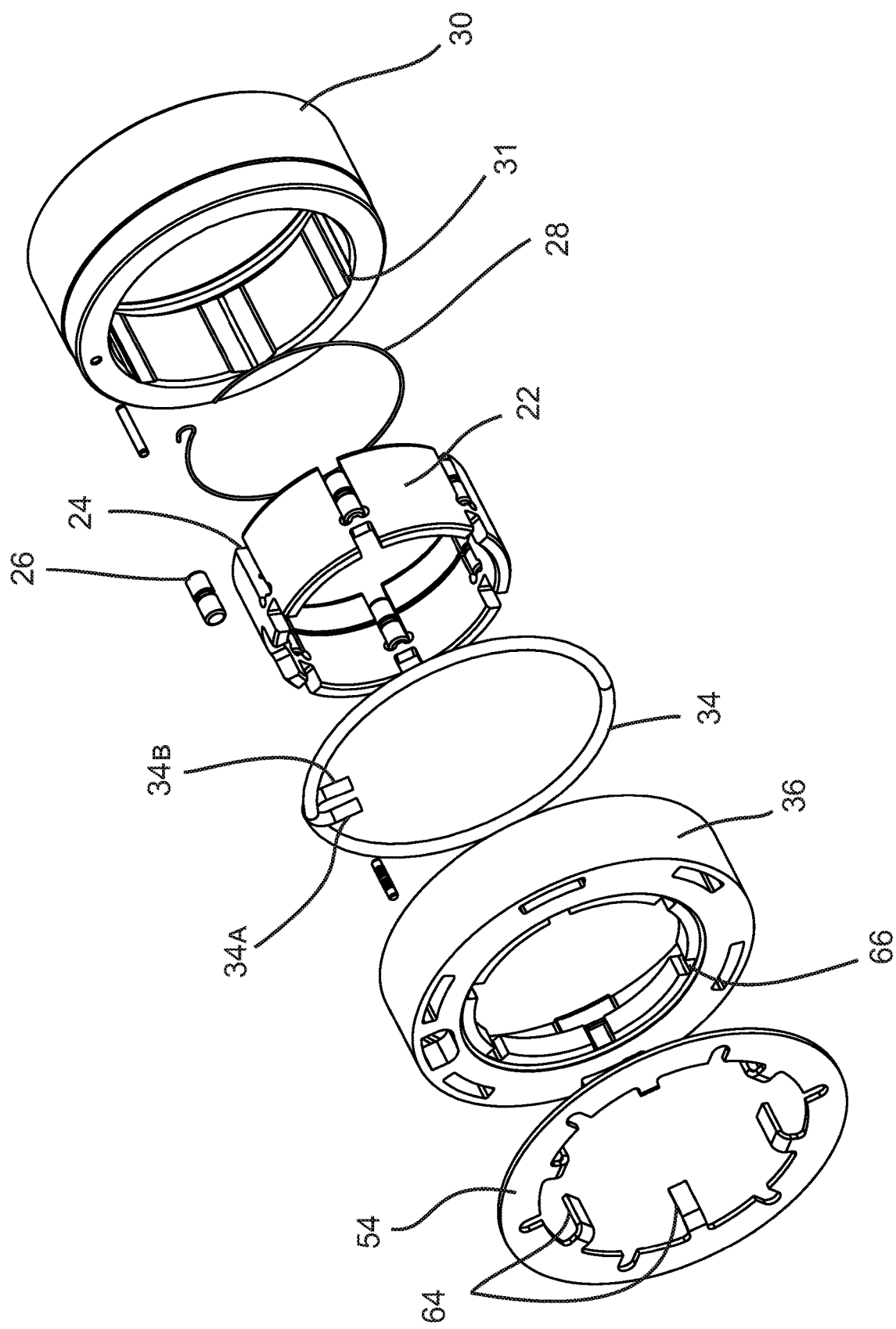

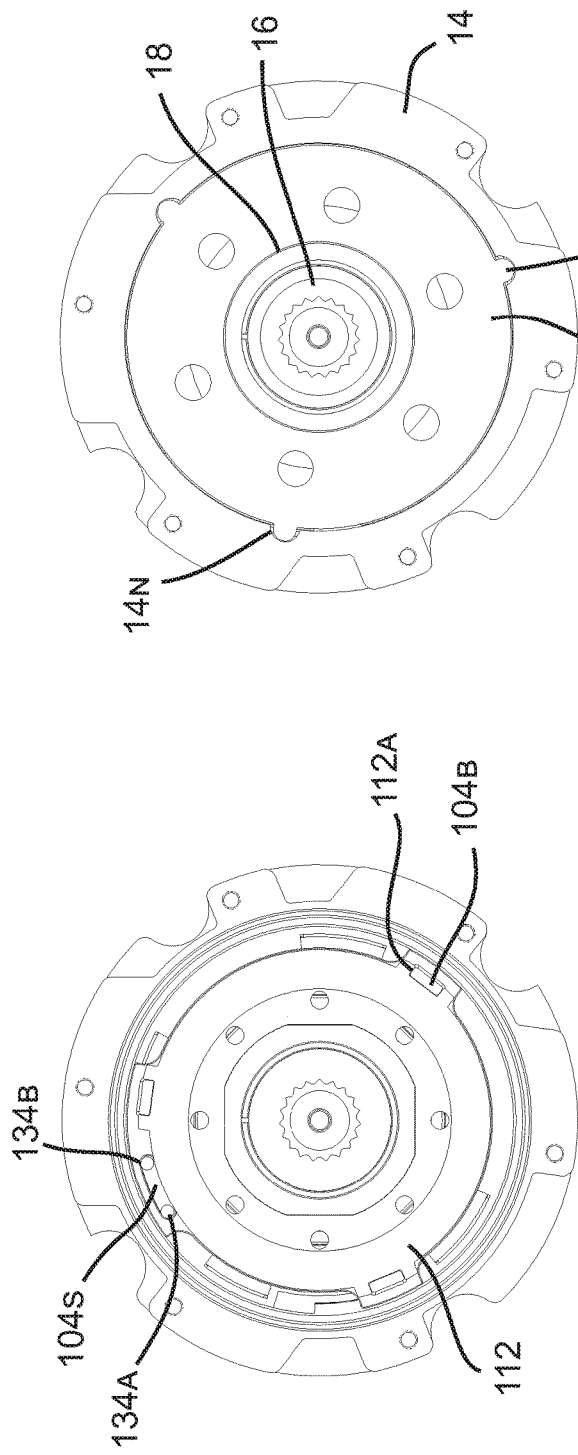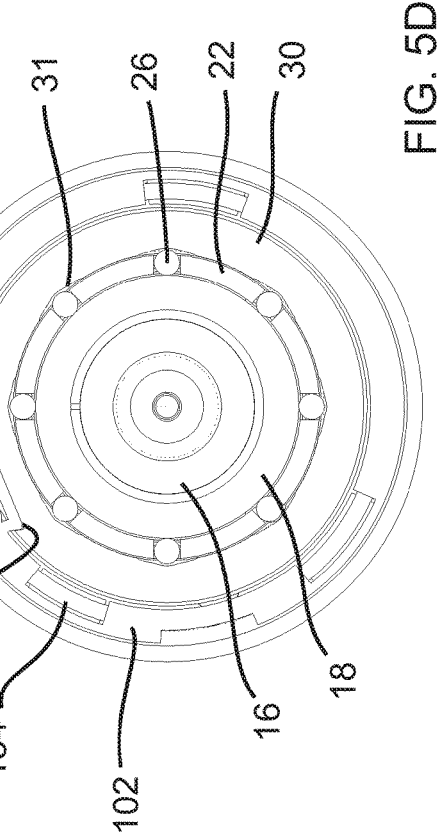

POWER TRANSMITTING CLUTCH AND DISCONNECT

FIELD OF THE INVENTION

The present invention relates to a clutch for transmitting power and torque between a drive component and a driven component, and including a disconnect mechanism for controlling power transmission.

BACKGROUND

Many drive systems exist that provide a transmission mechanism for transmitting power between an input drive, such as a transmission or drive shaft, and one or more output components, such as driven shafts or axles. The ability to control the transmission of power or torque between an input drive and an output drive, including powering on and off the ability to provide the power transmission, is fundamental to the overall operation of an all-terrain vehicle (ATV).

Current drive systems use different types of clutches and disconnects for controlling power transmission, see for example U.S. Pat. Nos. 7,591,355; 7,849,988; and 8,641,575. Each of the devices shown in those patents includes a friction mechanism (i.e., multiple friction plates) to transmit power between input and output drivetrain elements. One drawback to the use of friction plates for a drive mechanism is that wear of the friction clutch material can happen over time due to slipping at engagement or overload. As such, torque capacity of the friction clutch can fade over time due to wear. This leads to a loss of overall power transmission.

A need exists for an improved clutch-based disconnect for a power drive train.

SUMMARY OF THE INVENTION

An improved coupling is provided which includes a housing with a cover. At least a portion of an input shaft is located in the housing and configured to connect to a first drivetrain component outside of the housing which transmits rotary motion to the input shaft. At least a portion of an output shaft is also located in the housing and configured to connect to a second drivetrain element outside of the housing which is intended to be rotated. A portion of one of either the input and output shaft is inside the other and a bearing is located between a portion of an outside diameter of the inner of the shafts and a portion of an inside diameter of a cavity of the other of the shafts.

A bi-directional roller clutch assembly is provided for selectively connecting and disconnecting the input and output shafts from one another. The roller clutch assembly includes a roll cage located inside a clutch housing and configured to rotate relative to the clutch housing. The roll cage has a plurality of slots formed in and spaced about the circumference of the roll cage. A roll is rotatably disposed in each slot, and at least one spring positioned to bias the roll from moving radially inward in the slots. The roll cage is positioned about a portion of the output shaft such that spring biases the rolls away from contact with the output shaft.

The clutch housing has an inner circumference with a contoured cam surface formed on the inner circumference. The cam surface includes (i) first contour portions where the rolls are capable of contacting one of either the output shaft or the cam surface but not both so that the output shaft is not rotationally connected to the clutch housing, and (ii) second contour portions where the rolls are capable of contacting both the output shaft and the cam surface so that the output shaft is rotationally connected to the clutch housing through the roller clutch assembly.

A drive plate is disposed about and attached to a portion of the input shaft so as to rotate in combination therewith. The drive plate is rotationally connected to the clutch housing such that rotation of the input shaft produces corresponding rotation of the clutch housing.

A torsion spring and a spring retainer are included in the coupling. The torsion spring is positioned within the spring retainer and engaged with at least one of either the spring retainer or the clutch housing.

An engagement control assembly is provided for controlling the engagement and disengagement of the bi-directional roller clutch assembly. The engagement control assembly includes an electromechanical device including a coil housing mounted in the cover and an electromagnetic coil mounted in the coil housing. The coil is connected to a switch for controlling the supply of current to the coil. The coil has an active state such that when power is sent to the coil, the coil generates a magnetic flux in the active state, and an inactive state when no power is sent to the coil and no magnetic flux is generated. At least one armature plate is disposed about the output shaft and positioned near the coil. The armature plate provides a connection between the output shaft and the torsion spring when the coil is activated.

In an embodiment, the input shaft is a stub shaft and includes internal splines that engage with a drive shaft. The drive shaft is connected to the first drivetrain component which transmits rotary motion to the drive shaft and, in turn, the input shaft.

In one embodiment, each second contour portion of the cam surface is located adjacent to one of the first contour portions and angles away from the first contour portion toward the output shaft.

In one embodiment, there is one second contour portion located on either side of each first contour portion, with each of those second contour portions angling away from the first contour portion and from each other, and wherein one of the second contour portions provides a wedging surface for the associated roll during normal torque transmission from the input shaft to the output shaft, and the other of the second contour portions provides a wedging surface for the associated roll during backdriving for transmitting torque from the output shaft to the input shaft.

In an embodiment, the drive plate has an outer periphery with at least one tab or spline that engages with a mating recess or spline formed on the clutch housing to provide the rotational connection between the drive plate and the clutch housing.

In an embodiment, the torsion spring is engaged with both the spring retainer and the clutch housing, and the roll cage is connected to the spring retainer so that the spring retainer and roll cage rotate in combination.

Preferably the torsion spring retainer is connected to the clutch housing so that the spring retainer rotates in combination with the clutch housing.

The torsion spring may have a shape that is slightly larger than a complete circle so that the spring ends overlap with two arms that extend radially inward and form a gap. A clutch pin is attached to and protrudes laterally outward from a face of the clutch housing toward the spring retainer and extends into the gap with the arms on either side of the clutch pin. A retainer pin extends laterally outward from a side of the spring retainer and into the gap adjacent to the clutch pin with the arms on either side of the retainer pin.

In an embodiment, the arms of the torsion spring bias the roll cage and clutch housing to their respective neutral position relative to one another. When either the clutch housing or the spring retainer rotates relative to the other, each of the pins bear against one of the arms causing the arms to move apart and the torsion spring to deflect, which causes the torsion spring to act against the rotation, attempting to return the arms to their neutral position.

In one configuration, there are at least two armature plates—a first armature plate and a second armature plate. The first armature plate is connected to the spring retainer such that the first armature plate rotates with the spring retainer and the second armature plate is connected to the output shaft such that the second armature plate rotates in combination with the output shaft. The magnetic flux generated by the coil when in its active state attracts the first armature plate to the second armature plate. The magnetic attraction of the first armature plate to the second armature plate results in a connection from the input shaft, through the drive plate, the clutch housing, the torsion spring, the spring retainer, the first armature plate, and the second armature plate to the output shaft. In this configuration if the input shaft is rotating faster than the output shaft while the coil is in its active state, the slower rotating output shaft and second armature plate will magnetically drag the first armature plate, causing the spring retainer to rotate relative to the input shaft and index the roll cage into an engaged position where the rolls wedge between the inner contour of the clutch housing and the outer surface of the output shaft. If the output shaft is rotating faster than the input shaft while the coil is in its activate state, the second armature plate will be turning faster than the first armature plate. The magnetic force and friction acting between the two armature plates will cause the second armature plate to rotate the first armature plate which rotates the spring retainer relative to the input shaft causing the torsion spring to deflect and rotate the roll cage changing the relative position of the rolls relative to the contoured inner surface and the input shaft, thus causing the rolls to engage the contoured inner surface thereby locking the output shaft to the input shaft so as to transmit torque from the output shaft to the input shaft.

Preferably the first armature plate has one or more tabs that engage with slots formed in the torsion spring retainer and extend into slots formed in the roll cage, thereby connecting the roll cage to the first armature plate and the torsion spring retainer so that they all rotate in combination. The second armature plate is preferably splined onto the output shaft, and includes one or more slotted openings to permit magnetic flux to pass through to the first armature plate.

In an embodiment, the at least one armature plate is a single armature plate, that is attached to the cover so as to be fixed relative to the output shaft. The clutch basket is disposed about a portion of the roll cage and adjacent to one face of the clutch housing. The clutch basket includes tabs extending radially inward which engage with mating slots in the roll cage so that the clutch basket and roll cage rotate in combination. The spring retainer is attached to the clutch housing such that the torsion spring and clutch basket function to bias the roll cage into its neutral position relative to the clutch housing.

In one configuration the torsion spring has a shape that is slightly less than a complete circle with two arms extending laterally away from a body of the torsion spring and substantially parallel to one another. The arms extend through a slot in the spring retainer when the torsion spring is located inside the spring retainer, and through a slot in the clutch basket. When one of either the clutch basket or the spring retainer rotates relative to the other, the slot in the clutch basket causes one of the arms of the torsion spring to move relative to the other of the other arm thereby deflecting the torsion spring.

In one configuration, the coupling includes a clutch pack for providing an interconnection between the clutch basket and the output shaft. The clutch pack has at least two hub plates that are disposed about and engaged with the output shaft such that the hub plates rotate in combination with the output shaft. A cage plate is located between the at least two hub plates and rotatable relative to the output shaft. The cage plate has notches that engage with tabs that project from one side of the clutch basket such that the cage plate rotates in combination with the clutch basket.

The hub plates may be splined to the output shaft though one or more flat surfaces formed on the inner circumference of the hub plates that mate with corresponding flat surfaces formed on the outer circumference of a portion of the output shaft.

The coupling may include at least two thrust washers spaced apart by a needle bearing. The thrust washers and needle bearing are disposed about a portion of the output shaft and compressed against one of the hub plates of the clutch pack by the armature plate. The thrust washers and needle bearing can rotate relative to the armature plate and relative to each other. The coefficient of friction between the needle bearing and the thrust washers is lower than the coefficient of friction between the thrust washers and the armature plate and hub plate such that the needle bearing will rotate relative to the thrust washers while the thrust washers are held stationary against armature plate and hub plate.

A locking spring may be disposed about a portion of the output shaft and compressed between a portion of the cover and the armature plate. The locking spring urges the armature plate into the thrust washers and needle bearing which, in turn, apply axial pressure against the clutch pack. The pressure on the clutch pack retards rotation of the clutch basket which, due to its connection to the roll cage, retards the roll cage.

In an embodiment a coupling is provided that includes a housing with a cover. At least a portion of an input shaft is located in the housing and configured to connect to a first drivetrain component outside of the housing which transmits rotary motion to the input shaft. At least a portion of an output shaft is also located in the housing and configured to connect to a second drivetrain element outside of the housing which is intended to be rotated. A portion of one of the input shaft and output shaft is located within an internal cavity of the other and a bearing is located between the input shaft and the output shaft so as to permit one to rotate relative to the other.

A bi-directional roller clutch assembly is included in this embodiment for selectively connecting and disconnecting the input and output shafts from one another. The roller clutch assembly includes a roll cage located inside a clutch housing and configured to rotate relative to the clutch housing. The roll cage has a plurality of slots formed in and spaced about the circumference of the roll cage. A roll is rotatably disposed in each slot, and at least one spring positioned to bias the roll from moving radially inward in the slots. The roll cage is positioned about a portion of the output shaft such that the at least one spring biases the rolls away from contact with the output shaft.

The clutch housing has an inner circumference with a contoured cam surface formed on the inner circumference.

The cam surface includes (i) first contour portions where the rolls are capable of contacting one of either the output shaft or the cam surface but not both so that the output shaft is not rotationally connected to the clutch housing, and (ii) second contour portions where the rolls are capable of contacting both the output shaft and the cam surface so that the output shaft is rotationally connected to the clutch housing through the roller clutch assembly.

A drive plate is disposed about and attached to a portion of the input shaft so as to rotate in combination therewith. The drive plate is rotationally connected to the clutch housing such that rotation of the input shaft produces corresponding rotation of the clutch housing.

A torsion spring and a spring retainer are included in the coupling. The torsion spring is positioned within the spring retainer and engaged with both the spring retainer or the clutch housing, so that the torsion spring retainer rotates in combination with the clutch housing. The roll cage is connected to the spring retainer so that the spring retainer and roll cage rotate in combination. The torsion spring has a shape that is slightly larger than a complete circle so that the spring ends overlap with two arms that extend radially inward and form a gap. A clutch pin is attached to and protrudes laterally outward from a face of the clutch housing toward the spring retainer and extends into the gap with the arms on either side of the clutch pin. A retainer pin extends laterally outward from a side of the spring retainer and into the gap adjacent to the clutch pin with the arms on either side of the retainer pin. The arms of the torsion spring bias the roll cage and clutch housing to their respective neutral position relative to one another, and when either the clutch housing or the spring retainer rotate relative to the other, each of the pins bear against one of the arms causing the arms to move apart and the torsion spring to deflect, which causes the torsion spring to act against the rotation, attempting to return the arms to their neutral position.

An engagement control assembly is provided for controlling the engagement and disengagement of the bi-directional roller clutch assembly. The engagement control assembly includes an electromechanical device that has a coil housing mounted in the cover and an electromagnetic coil mounted in the coil housing. The coil is connected a switch for controlling the supply of current to the coil. The coil has an active state when power is sent to the coil which generates a magnetic flux, and an inactive state when no power is sent to the coil and no magnetic flux is generated. A first armature plate and a second armature plate are provided. The first armature plate has one or more tabs that engage with slots formed in the spring retainer and extend into slots formed in the roll cage, thereby connecting the roll cage to the first armature plate and the torsion spring retainer so that they all rotate in combination. The second armature plate is splined onto the output shaft such that the second armature plate rotates in combination with the output shaft. The magnetic flux generated by the coil when in its active state attracts the first armature plate to the second armature plate.

In the active state, the magnetic attraction of the first armature plate to the second armature plate results in a connection from the input shaft, through the drive plate, the clutch housing, the torsion spring, the spring retainer, the first armature plate, and the second armature plate to the output shaft.

In this embodiment, if the input shaft is rotating faster than the output shaft while the coil is in its active state, the slower rotating output shaft and second armature plate will magnetically drag the first armature plate, causing the spring retainer to rotate relative to the input shaft and index the roll cage into an engaged position where the rolls wedge between the inner contour of the clutch housing and the outer surface of the output shaft.

If the output shaft is rotating faster than the input shaft while the coil is in its activate state, the second armature plate will be turning faster than the first armature plate. As such, the magnetic force and friction acting between the two armature plates will cause the second armature plate to rotate the first armature plate which rotates the spring retainer relative to the input shaft causing the torsion spring to deflect and rotate the roll cage changing the relative position of the rolls relative to the contoured inner surface and the input shaft, thus causing the rolls to engage the contoured inner surface thereby locking the output shaft to the input shaft so as to transmit torque from the output shaft to the input shaft.

In another embodiment, a coupling is provided that includes a housing with a cover. At least a portion of an input shaft is located in the housing. The input shaft is configured to connect to a first drivetrain component outside of the housing which transmits rotary motion to the input shaft. At least a portion of an output shaft is also located in the housing, the output shaft is configured to connect to a second drivetrain element outside of the housing which is intended to be rotated.

A portion of one of the input shaft and output shaft is located within an internal cavity of the other and a bearing is located between the input shaft and the output shaft so as to permit one to rotate relative to the other.

A bi-directional roller clutch assembly is provided for selectively connecting and disconnecting the input and output shafts from one another. The roller clutch assembly includes a roll cage located inside a clutch housing and configured to rotate relative to the clutch housing. The roll cage has a plurality of slots formed in and spaced about the circumference of the roll cage. A roll is rotatably disposed in each slot, and at least one spring positioned to bias the roll from moving radially inward in the slots. The roll cage is positioned about a portion of the output shaft such that the spring biases the rolls away from contact with the output shaft.

The clutch housing has an inner circumference with a contoured cam surface formed on the inner circumference. The cam surface includes (i) first contour portions where the rolls are capable of contacting one of either the output shaft or the cam surface but not both so that the output shaft is not rotationally connected to the clutch housing, and (ii) second contour portions where the rolls are capable of contacting both the output shaft and the cam surface so that the output shaft is rotationally connected to the clutch housing through the roller clutch assembly.

A drive plate is disposed about and attached to a portion of the input shaft so as to rotate in combination therewith. The drive plate is rotationally connected to the clutch housing such that rotation of the input shaft produces corresponding rotation of the clutch housing.

A torsion spring and a spring retainer are provided. Preferably the torsion spring is positioned within the spring retainer and engaged with the spring retainer. The torsion spring has a shape that is slightly less than a complete circle with two arms extending laterally away from a body of the torsion spring and substantially parallel to one another. The arms extend through a slot in the spring retainer and through a slot in the clutch basket. When one of either the clutch basket or the spring retainer rotates relative to the other, the slot in the clutch basket causes one of the arms of the torsion spring to move relative to the other of the other arm thereby deflecting the torsion spring.

An engagement control assembly is included for controlling the engagement and disengagement of the bi-directional roller clutch assembly. The engagement control assembly includes an electromechanical device with a coil housing mounted in the cover and an electromagnetic coil mounted in the coil housing. The coil is connected to a switch for controlling the supply of current to the coil. The coil has an active state when power is sent to the coil so that the coil generates a magnetic flux, and an inactive state when no power is sent to the coil and no magnetic flux is generated. An armature plate is disposed about the output shaft and positioned near the coil. The armature plate is attached to the cover so as to be fixed relative to the output shaft.

A clutch basket is disposed about a portion of the roll cage and adjacent to one face of the clutch housing. The clutch basket includes tabs extending radially inward which engage with mating slots in the roll cage so that the clutch basket and roll cage rotate in combination. The torsion spring retainer is attached to the clutch housing such that the torsion spring and clutch basket function to bias the roll cage into its neutral position relative to the clutch housing.

A clutch pack is preferably included in this embodiment for providing an interconnection between the clutch basket and the output shaft. The clutch pack has at least two hub plates that are disposed about and engaged with the output shaft such that the hub plates rotate in combination with the output shaft. A cage plate is located between the at least two hub plates and is rotatable relative to the output shaft. The cage plate has notches that engage with tabs that project from one side of the clutch basket such that the cage plate rotates in combination with the clutch basket.

At least two thrust washers are preferably spaced apart by a needle bearing. The thrust washers and needle bearing are disposed about a portion of the output shaft and compressed against one of the hub plates of the clutch pack by the armature plate. The thrust washers and needle bearing can rotate relative to the armature plate and relative to each other. The coefficient of friction between the needle bearing and the thrust washers is lower than the coefficient of friction between the thrust washers and the armature plate and hub plate such that the needle bearing will rotate relative to the thrust washers while the thrust washers are held stationary against armature plate and hub plate. A locking spring is disposed about a portion of the output shaft and compressed between a portion of the cover and the armature plate. The locking spring urges the armature plate into the thrust washers and needle bearing which, in turn, apply axial pressure against the clutch pack. The pressure on the clutch pack retards rotation of the clutch basket which, due to its connection to the roll cage, retards the roll cage.

The foregoing and other features of the invention and advantages of the present invention will become more apparent in light of the following detailed description of the preferred embodiments, as illustrated in the accompanying drawings. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of the illustrating the invention, the drawings show a form of the invention which is presently preferred. However, it should be understood that this invention is not limited to the precise arrangements and instrumentalities shown in the drawings.

FIG. 2A is an enlarged detail of a portion of the coupling of FIG. 1.

FIG. 5B is a cross-sectional view of the coupling shown in FIG. 5A taken along lines 5B-5B.

FIG. 5C is a cross-sectional view of the coupling shown in FIG. 5A taken along lines 5C-5C.

FIG. 5D is a cross-sectional view of the coupling shown in FIG. 5A taken along lines 5D-5D.

DETAILED DESCRIPTION

Figure 1:
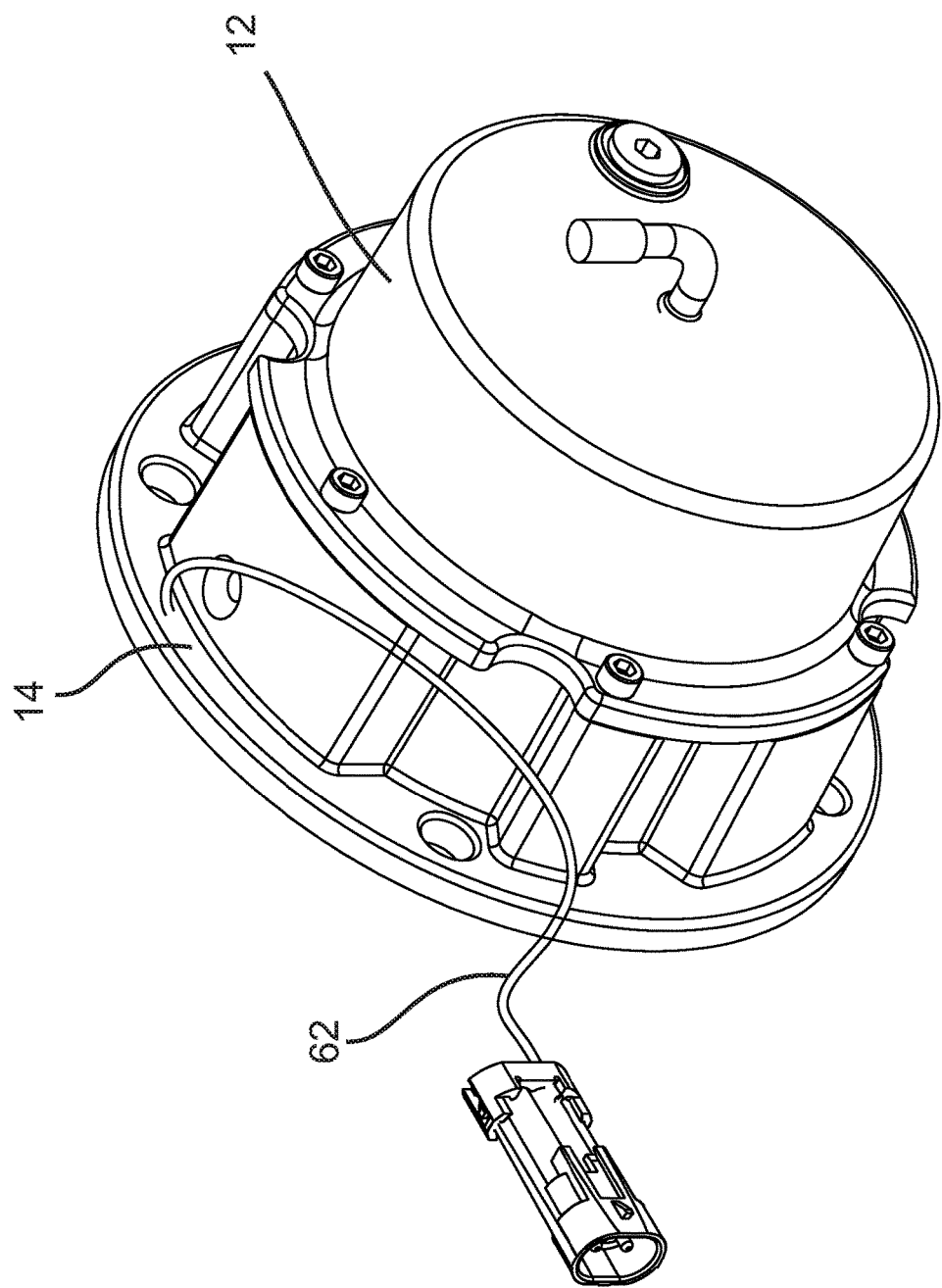
FIG. 1 is a perspective view of an embodiment of a power transmitting coupling according to the present invention.

Referring now to the drawings, preferred embodiments of the invention are shown. FIG. 1 illustrates a perspective view of an assembled coupling 10 according to the invention. The coupling 10 is designed to couple an input shaft to an output shaft, preferably an output shaft that is mounted around the input shaft, although the invention is not limited to that. The input shaft is engaged with a first drivetrain component and the output shaft is engaged with a second drivetrain component.

Figure 2:
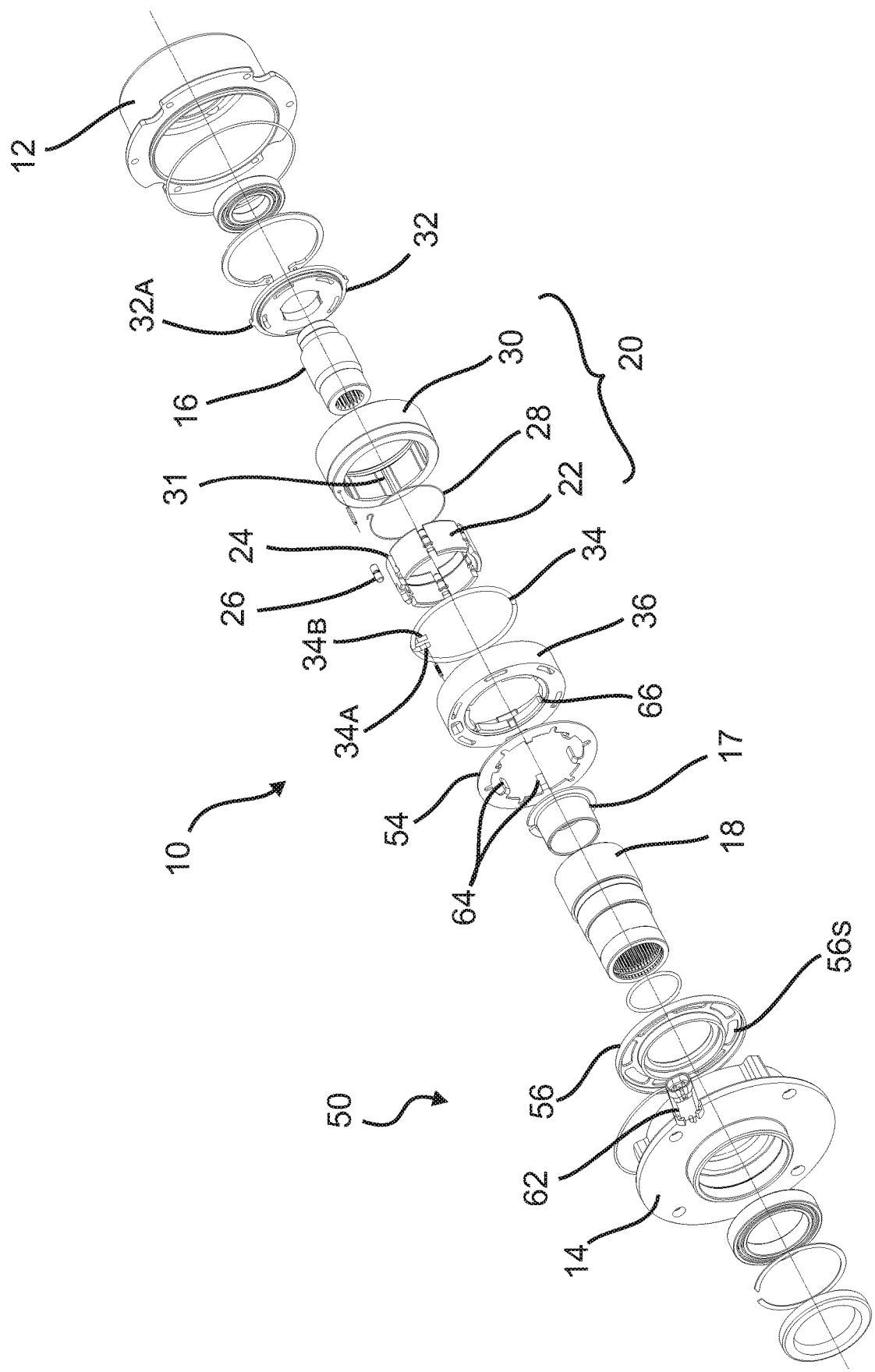
FIG. 2 is an exploded view of one embodiment of the coupling of FIG. 1.
Figure 3:
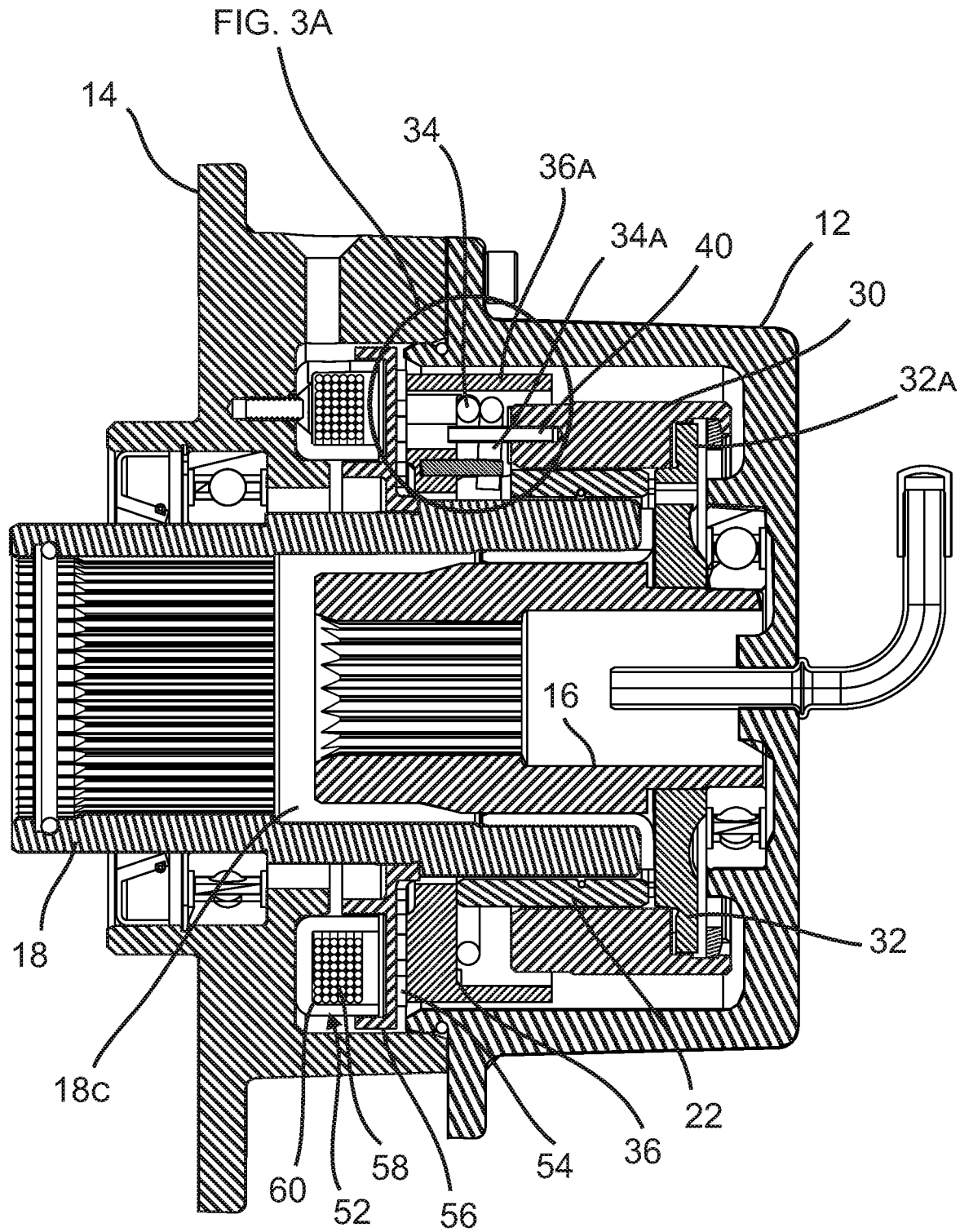
FIG. 3 is a cross-sectional view of the embodiment of the coupling shown in FIG. 2.

A first embodiment of the coupling 10 is shown in FIGS. 2, 3, 3A and 3B. FIG. 2 illustrates an exploded view of a bi-directional coupling 10 according to one embodiment of the invention. FIG. 3 is a cross-section of the coupling of FIG. 2. The coupling 10 includes a housing 12 with a cover 14. An input shaft 16 extends into or is located in the housing 12. In the illustrated embodiment, the input shaft 16 is a stub shaft that is located inside the housing 12 and which includes internal splines that engage with a drive shaft (not shown in FIG. 2). The drive shaft is connected to a first drivetrain component, such as an engine or a transmission, which transmits rotary motion to the drive shaft and, in turn, the input shaft 16. The drive shaft could also receive rotary motion from a differential connected to power driven wheels.

An output shaft 18 is also located in or extends into the housing 12. The output shaft 18 is configured to connect to a second drivetrain element, such as driven wheels, typically through a driven shaft. In the illustrated embodiment, a portion of the input shaft 16 is located within an internal cavity 18c of the output shaft 18. A bearing 17 is located between a portion of an outside diameter of the input shaft 16 and a portion of the inside diameter of the cavity of the output shaft 18. The bearing 17 permits the input shaft 16 to rotate relative to the output shaft 18. The input and output shafts 16, 18 can be selectively connected or disconnected from one another by locking or un-locking a bi-directional roller clutch assembly 20 as will be discussed in more detail below.

The roller clutch assembly 20 includes a roll cage 22 with a plurality of slots 24 formed in cage, the slots 24 being spaced equidistant from one another about the circumference of the cage 22. A roll 26 is rotatably located in each slot 24. One or more springs 28 are positioned to preferably bias the rolls radially outward or, more specifically biases the rolls 26 from moving inward. In the illustrated embodiment, one spring 28, such as a wireform spring or compression garter spring, extends around an inner circumference of the roll cage 22 and biases all the rolls 26 radially outward against inward motion. The rolls 26 may include a circumferential groove in which the spring 28 sits to help with centering of the rolls 26 in the slots 24. It is also contemplated that there could be one or more springs associated with each roll 26 and slot 24, such as H-clip springs, C-clip springs, or leaf springs. Various springs configurations are described in U.S. Pat. Nos. 6,722,484 and 6,629,590, the disclosure of which are incorporated herein by reference in their entirety. The springs position the rolls 26 in the slots 24. The spring 28 accounts for tolerances in the manufacturing of the various components of the roller clutch assembly 20 so that all the rolls 26 engage at the same time. Specifically, the spring 28 biases the rolls into contact with the clutch housing.

The roll cage 22 is positioned about the outer circumference of a portion of the output shaft 18 such that the spring 28 biases the rolls 26 away from contact with the surface of the output shaft 18.

As mentioned above, the roll cage 22 is positioned inside a clutch housing 30 and capable of moving rotationally with respect to the clutch housing 30 as will be discussed in more detail. The inner surface 31 of the clutch housing 30 includes a contoured cam surface formed on the inner circumference of the clutch housing 30. The cam surface preferably includes a plurality of 'peaks_spaced apart from the roll 26 such that the roll 26 is capable of rotating about its axis while in contact with the output shaft 18 but without contacting the contoured cam surface of the clutch housing 30 there the 'peak_ is located. The contoured cam surface 31 preferably tapers on either side of the 'peak_such that when the roll 26 is not centered under the peak, the roll 26 is in contact with the taper of the contoured cam surface 31 and the output shaft 18. The shape of one preferred contoured cam surface is shown in FIG. 2A and U.S. Pat. No. 6,622,837, the disclosure of which is incorporated herein by reference in its entirety. The inner contoured cam surface 31 preferably includes similarly shaped tapered surfaces on both sides of the 'peak_. One taper is referred to as a forward cam surface and the other taper is referred to as a reverse cam surface. The forward cam surface provides the wedging surface during normal torque transmission from the input shaft 16 to the output shaft 18. The reverse cam surface provides the wedging surface during backdriving, when the output shaft 18 is transmitting torque to the input shaft 16 as will be discussed in more detail below. The shapes of cam surface on clutch housings and the operation of roller clutch assemblies are well known to those skilled in the art and, therefore, a detailed discussion is not necessary.

The input shaft 16 is connected to clutch housing 30. Specifically, a drive plate 32 is splined or attached to a portion of the input shaft 16. In the illustrated embodiment, the input shaft 16 includes at least one, and preferably two, flat lands formed on its circumference. The drive plate 32 is preferably annular with an inner hole sized to fit around the circumference of a portion of the input shaft 16 with flat sections that correspond to the flat lands on the input shaft 16. Thus, when the drive plate 32 is slid onto the input shaft 16, the inner hole flat sections mate with the flat lands, thus locking the drive plate 32 to the input shaft 16 so that the drive plate 32 rotates in combination with the input shaft 16. Other mechanisms can be used to rotationally lock the drive plate 32 to the input shaft 16. The outer periphery of the drive plate 32 includes one or more tabs or splines $32_A$ that are configured to engage with mating recesses or splines (not shown) formed on the clutch housing 30 to lock the drive plate 32 rotationally to the clutch housing 30. As such, rotation of the input shaft 16 produces rotation of the drive plate 32 which, in turn, causes the clutch housing 30 to rotate. In the illustrated embodiment, the tabs extend radially outward and engage with mating notches in the clutch housing 30.

Figure 3A:
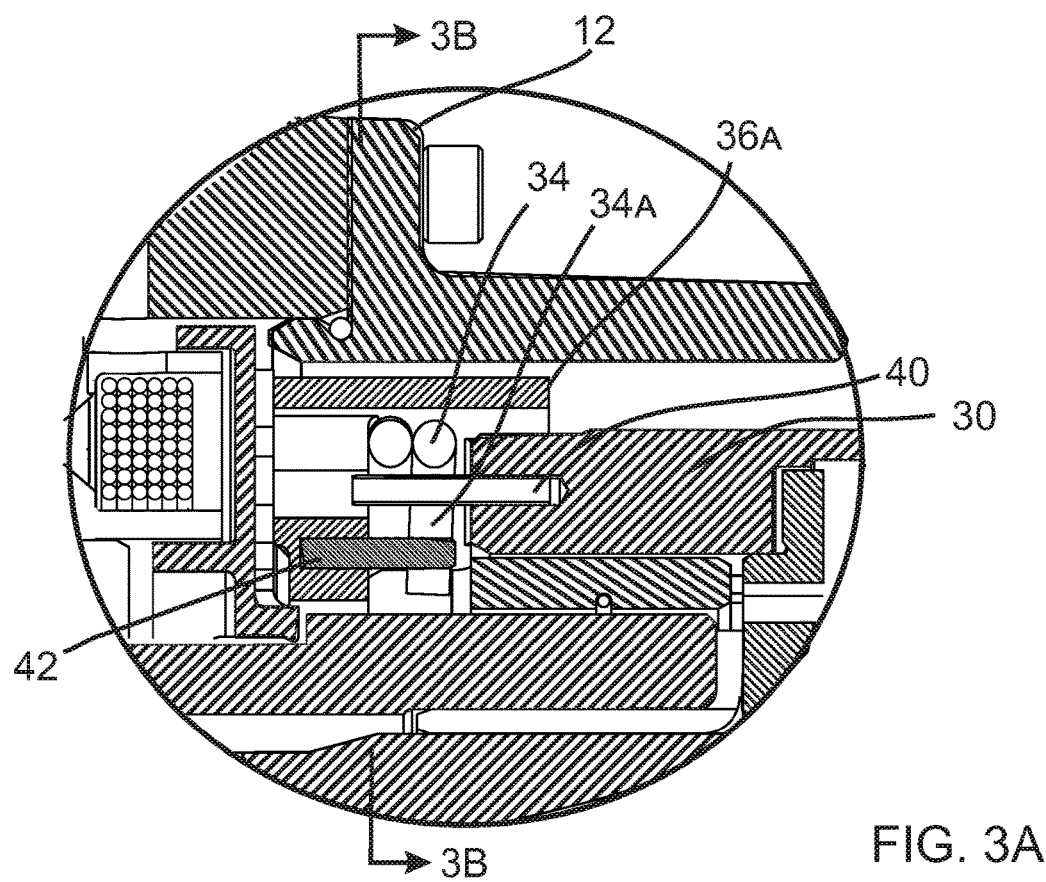
FIG. 3A is an enlarged view of a portion of the cross-sectional view of FIG. 3.
Figure 3B:
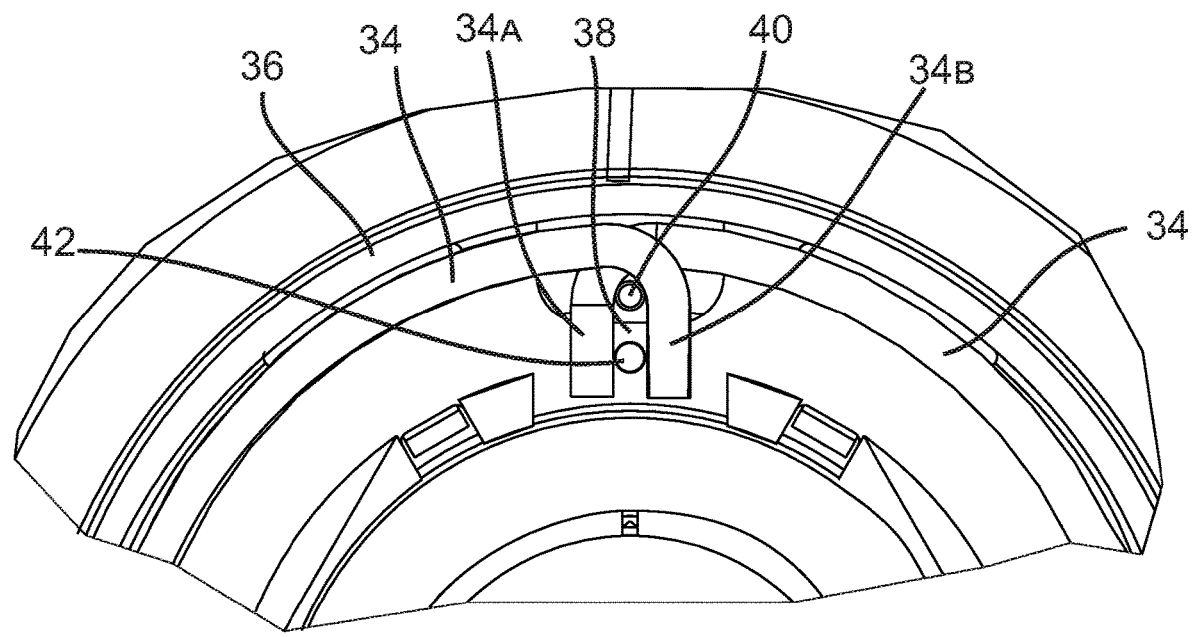
FIG. 3B is a cross-sectional view of the portion of the coupling taken along lines 3B-3B in FIG. 3A.
Figure 4:
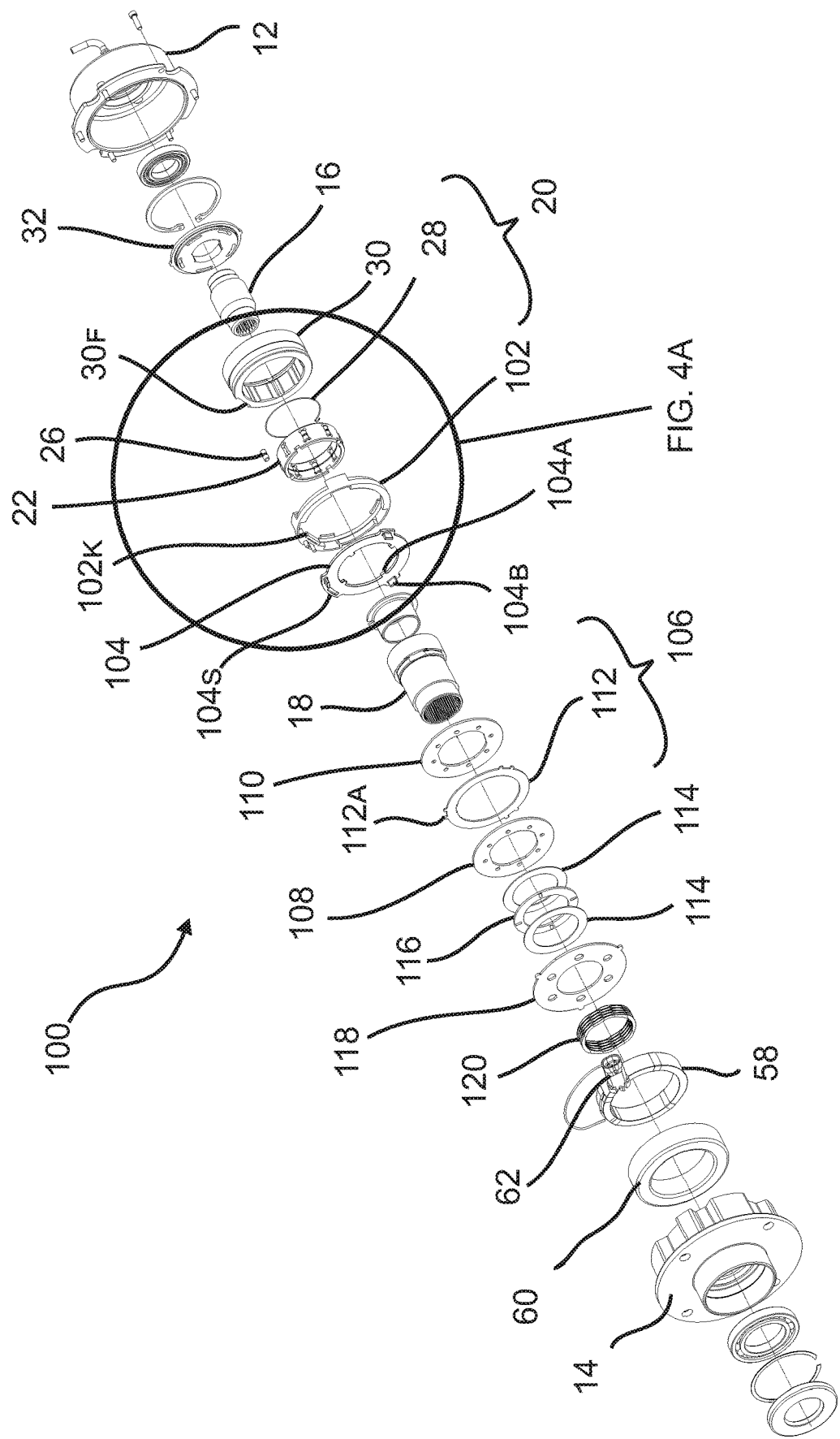
FIG. 4 is an exploded view of a second embodiment of the coupling of FIG. 1.
Figure 4A:
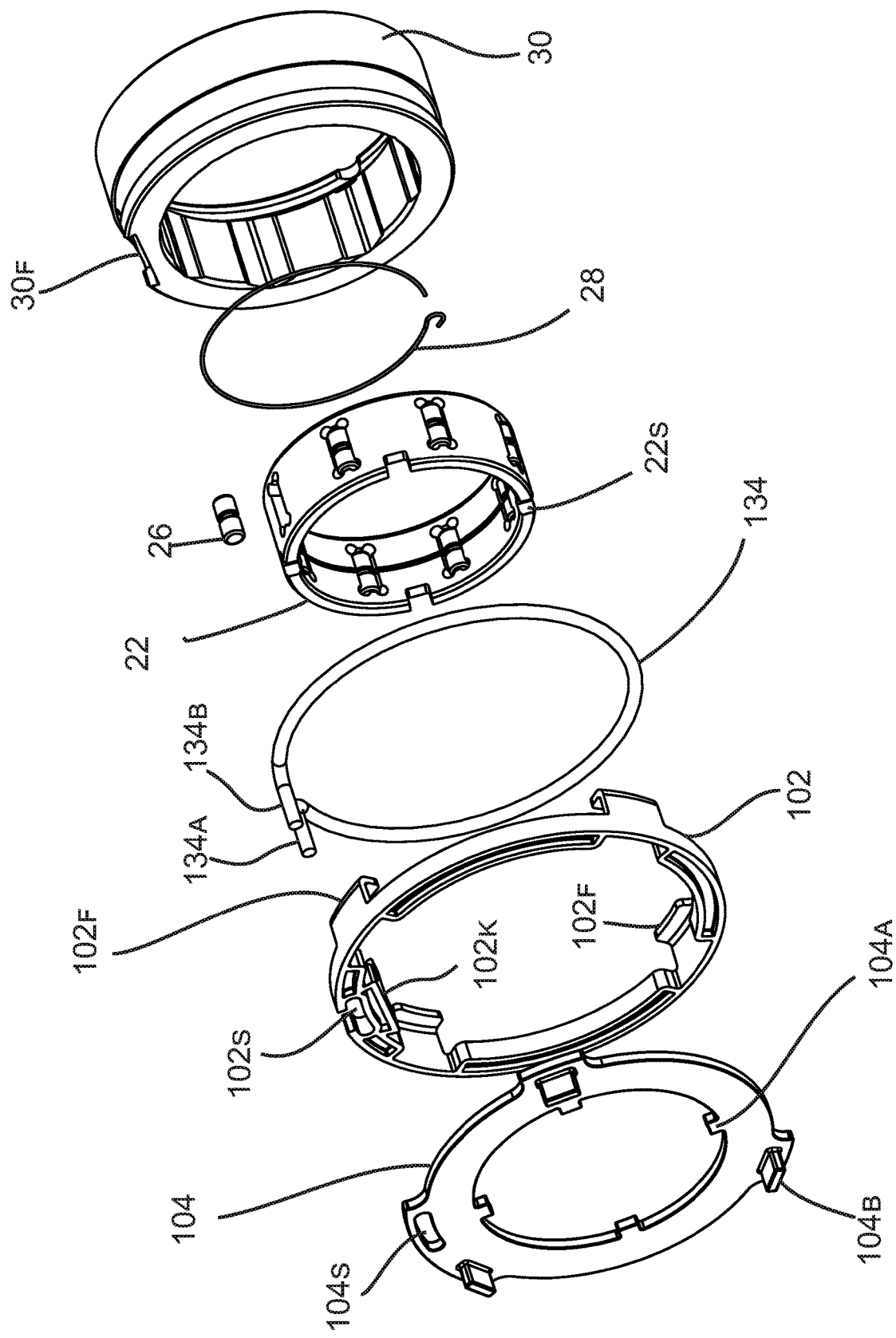
FIG. 4A is an enlarged detail of a portion of the coupling of FIG. 4.

The bi-directional roller clutch assembly 20 provides the connection for power transmission between the input shaft 16 and output shaft 18 by engaging and disengaging (wedging and unwedging) rolls 26 from their contact with the clutch housing 30 and the output shaft 18. This is achieved by shifting the roll cage 22, and thus the rolls 26, relative to the clutch housing 30. To accomplish this, the present invention includes a torsion spring 34 and a spring retainer 36 (FIG. 2A). The torsion spring 34 has a shape that is slightly larger than circular so that the spring ends overlap with two arms $34_A$, $34_B$ that extend radially inward. The arms form a gap 38. The torsion spring 34 is positioned within the spring retainer 36 and is engaged with both the spring retainer 36 and the clutch housing 30. Specifically, the spring retainer 36 includes an annular flange $36_A$ that faces toward the clutch housing 30. The torsion spring 34 is located inside the flange $36_A$ of the spring retainer 36. A clutch pin 40 is attached to and protrudes laterally outward from a face of the clutch housing 30 toward the spring retainer 36 and extends into the gap 38 with the arms $34_A$, $34_B$ on either side of the clutch pin 40. A retainer pin 42 extends laterally outward from a side of the spring retainer 36 that faces the clutch housing 30 and into the gap 38 below the clutch pin 40 and with the arms $34_A$, $34_B$ on either side of the retainer pin 42. This is depicted in FIGS. 3, 3A and 3B. The pins 40, 42 assist in maintaining the torsion spring 34 in the spring retainer 36.

The arms $34_A$, $34_B$ of the torsion spring 34 bias the roll cage 22 and clutch housing 30 to their neutral position relative to one another. The roll cage tangs 64 are connected to the spring retainer via slots 66 and then extend beyond those slots into the roll cage which has slots on its end. This makes the retainer 36 and roll cage 22 rotate together relative to the clutch housing 30. Specifically, as discussed in more detail below, when either the clutch housing 30 or the spring retainer 36 rotate relative to one another, each of the pins 40, 42 bear against one of the arms $34_A$, $34_B$ causing the arms to move apart and the torsion spring to deflect. The spring force of the torsion spring 34 acts against the rotation, attempting to return the arms $34_A$, $34_B$ to their neutral position and, thus, realign the roll cage 22 and the clutch housing 30. In the neutral position when the coil is not activated, the rolls are not wedged and, as such, the clutch is unlocked and no torque is transmitted. A version of the torsion spring and spring retainer is described in U.S. Pat. No. 8,857,294, which is incorporated herein by reference in its entirety.

In order to control torque transmission between the input shaft 16 and the output shaft 18, the present invention utilizes an engagement control assembly 50 for controlling the engagement and disengagement of the bi-directional roller clutch assembly 20 as will be discussed in more detail below. In one embodiment, the engagement control assembly 50 includes an electromechanical device 52, such as a coil, solenoid or other electrically controlled mechanism, that engages, attracts or otherwise retains (either directly or indirectly) first and second armature plates 54, 56. In the embodiment illustrated in FIG. 3, the electromechanical device 52 is an electromagnetic coil 58 mounted within a coil housing or pocket 60. The electromechanical device 52 is mounted to the cover 14. A wiring harness 62 (shown in FIG. 2) extends out of the cover and connects to an electrical switch (not show) for controlling activation of the electromechanical device 52.

The first armature plate 54 is a generally flat annual plate disposed about and is not directly connected to the output shaft 18 but is able to rotate relative to the output shaft 18 when the electromagnet is not engaged. The first armature plate 54 is made from a material that is attracted magnetically, such as low carbon steel. The first armature plate 54 is engaged or connected to the spring retainer 36 such that the first armature plate 54 rotates with the spring retainer 36. As shown, in one embodiment, the first armature plate 54 has at least one and more preferably a plurality of tabs 64 that engage with slots 66 formed in the inside diameter of the spring retainer 36. Of course there are a number of different ways to engage or connect the first armature plate with the spring retainer 36 for allowing the two to rotate together. For example, the first armature plate could be a metallic material mounted to or formed on the spring retainer 36. The benefit of having a first armature plate that is separate from the spring retainer 36 is that it reduces the effect of the magnetic field interfering with the torsion spring 34. As should be apparent, in order not to be influenced by the magnetic force, the spring retainer is made from a nonmetallic material.

The second armature plate 56 is also annular in shape. It is connected to the output shaft 18 such that the second armature plate 58 rotates in combination with the output shaft 18. In one embodiment, the second armature plate 56 is pressed onto or splined onto the output shaft 18. Other mechanisms for attachment to the output shaft 18 are contemplated. For example, the second armature plate 56 could be formed as part of the output shaft 18. The second armature plate 56 preferably has a C-shape that extends around the pocket 60. The C-shape is configured to provide strong magnetic flux transmission to the plate without the plate physically touching the coil pocket. The non-contact between the armature and the coil pocket 60 is intended to reduce wear of the plate and coil pocket over time. The second armature plate 56 also preferably includes one or more slotted openings $56_S$ which are configured to permit magnetic flux to pass through to the first armature plate. This permits more torque to transmit between the plates.

As shown in FIGS. 2 and 3, the coil is oriented so that generation of a magnetic field is toward the first and second armature plates 54, 56. When the coil is not energized, there is no rotational connection between the input shaft 16 and the output shaft 18. As such, the input shaft 16 rotates independent from the output shaft 18. When power is supplied to the electromechanical device 52 (e.g., a switch on the console, handles or steering wheel is activated supplying electrical current through the harness 62 to the coil 58), a magnetic field is generated which pulls the first armature plate 54 into second armature plate 56. Thus, a connection is created from the input shaft 16, through the clutch housing 30, spring 34, spring retainer 66, first armature plate 54, second armature plate 56 and the output shaft 18. If the input shaft 16 is rotating faster than the output shaft 18 and the electromechanical device 52 is activated, the slower rotating output shaft 18 and second armature plate 56 will drag the first armature plate 54 (i.e., cause the first armature plate 54 to want to rotate at the same speed as the second armature plate 56). Since the first armature plate 54 is connected to the spring retainer 36 through the tabs 64, this will cause the spring retainer 36 to rotate relative to the input shaft 16 and, in turn, will cause it to index the roll cage 22 into an engaged position where the rolls 26 wedge between the inner contour of the clutch housing 30 and the outer surface of the output shaft 18. Hence once the coil is activated the rolls wedge immediately and, as a result, rotation (and torque) is transmitted from the input shaft 16 to the output shaft 18.

It should be readily apparent that if one of the input shaft 16 or output shaft 18 are rotating faster than the other, slippage may occur at the interface between the first and second armature plates 54, 56. The use of a pair of armature plates 54, 56 is beneficial in the present invention since it permits the coupling 10 to also provide backdrive capability when the coil is activated as described in U.S. Pat. No. 8,857,589, the disclosure of which is incorporated herein by reference in its entirety. Specifically, if the output shaft 18 is rotating faster than the input shaft 16, the rolls 26 will be disengaged (unwedged). At the same time, the second armature plate 56 will be turning faster than the first armature plate 54. The magnetic force and friction acting between the two armature plates causes the second armature plate 56 to rotate the first armature plate 54. The first armature plate 54, in turn, rotates the spring retainer 36 relative to the input shaft 16. As the spring retainer 36 rotates it causes the spring 34 to deflect and rotates the roll cage 22 changing the relative position of the rolls 26 relative to the contoured inner surface 31 and the input shaft 16. This results in the rolls 26 engaging (wedging) on the opposite side of the contour, thereby locking the output shaft 18 to the input shaft 16, with the output shaft 18 driving torque to the input shaft 16, thereby providing backdriving.

Referring now to FIGS. 4, 5 and 5A-5D, a second embodiment of a coupling generally designated with the reference 100 according to the present invention is illustrated. For the simplicity, features in the second embodiment that are identical to the first embodiment are not described in detail. In this embodiment, the input shaft 16, roll cage 22, rolls 26, clutch housing 30 and output shaft 18 are generally the same as described above. The structure for engaging and disengaging the rolls 26 from contact with the cam surfaces of the clutch housing 30 is as follows.

A torsion spring retainer 102 is disposed about a portion of the roller assembly 22, 26. The torsion spring retainer 102 engages with the clutch housing. More specifically, there is a flat $30_F$ on the outer circumference of the clutch housing 30 that is a dovetail keyway which mates with a male dovetail key $102_K$ on the torsion spring retainer 102.

A clutch basket 104 is also disposed about a portion of the roll cage 22 and adjacent to one face of the clutch housing 30. The clutch basket 104 includes an inner diameter hole with tabs $104_A$ extending radially inward which engage with mating slots $22_S$ in the end of the roll cage 22 (see FIG. 5A). Thus, the clutch basket 104 and roll cage 22 rotate in combination.

A torsion spring 134 is configured to be located in the torsion spring retainer 102. See FIGS. 5 and 5D. The torsion spring 134 has a shape that is slightly less than a diameter with two arms $134_A$, $134_B$ extending laterally away from the body of the spring and substantially parallel to one another. The arms $134_A$, $134_B$ extend through a slot $102_S$ in the torsion spring retainer 102 (see FIG. 5D) when the torsion spring is located inside the torsion spring retainer 102. Flanges 102F on the retainer 102 hold the torsion spring 134 in place. The arms $134_A$, $134_B$ also extend through a slot $104_S$ in the clutch basket 104 when the clutch basket is adjacent to the torsion spring retainer 102. As such, when the clutch basket 104 rotates relative to the torsion spring retainer 102, the slot 104S in the clutch basket moves one of the arms $134_A$, $134_B$ while the other arm remains stationary (held in place by the slot $102_S$ in the torsion spring retainer 102), thus deflecting the torsion spring 134. This creates a returning force (potential energy) in the spring 134 to rotate the clutch basket 104 back to its neutral position. Since the clutch basket 104 is keyed to the roll cage 22 through the tabs $104_A$ in the clutch basket 104 and the slots $22_S$ in the roll cage, and the torsion spring retainer is keyed to the clutch housing 30 through the tab or dovetail key $102_K$ and the flat $30_F$, the torsion spring 134 and clutch basket 104 assembly functions to bias the roll cage 22 into its neutral position relative to the clutch housing 30.

A clutch pack 106 provides an interconnection between the clutch basket and the output shaft 18. More specifically, the clutch pack 106 includes two hub plates 108, 110 that are disposed about and engaged with the output shaft 18 such that the hub plates 108, 110 rotate in combination with the output shaft 18. In the illustrated embodiment the hub plates 108, 110 are splined to the output shaft 18 though one or more flat surfaces formed on the inner circumference of the hub plates 108, 110 that mate with flat surface(s) on the outer circumference of a portion of the output shaft 18. A cage plate 112 is located between the hub plates 108, 110 but is not engaged to the output shaft 18. Instead, the cage plate 112 include notches 112A that engage with tabs 104B that project from one side of the clutch basket 104. Thus, the cage plate 112 rotates in combination with the clutch basket 104 and roll cage 22. It should be readily apparent that there could be multiple hub plates and cage plates interleaved with one another as needed.

Figure 5:
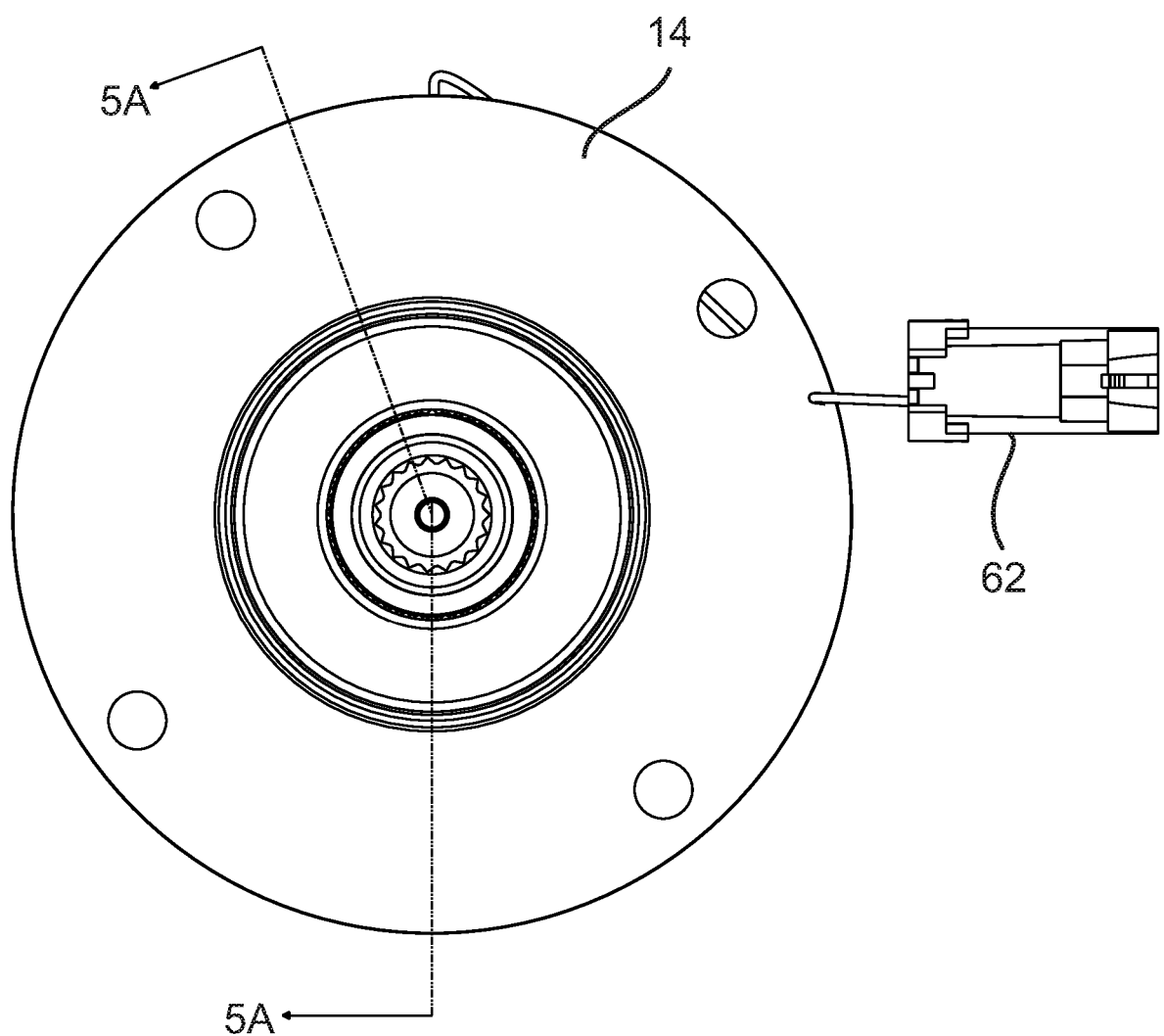
FIG. 5 is a front view of the coupling of FIG. 1.
Figure 5A:
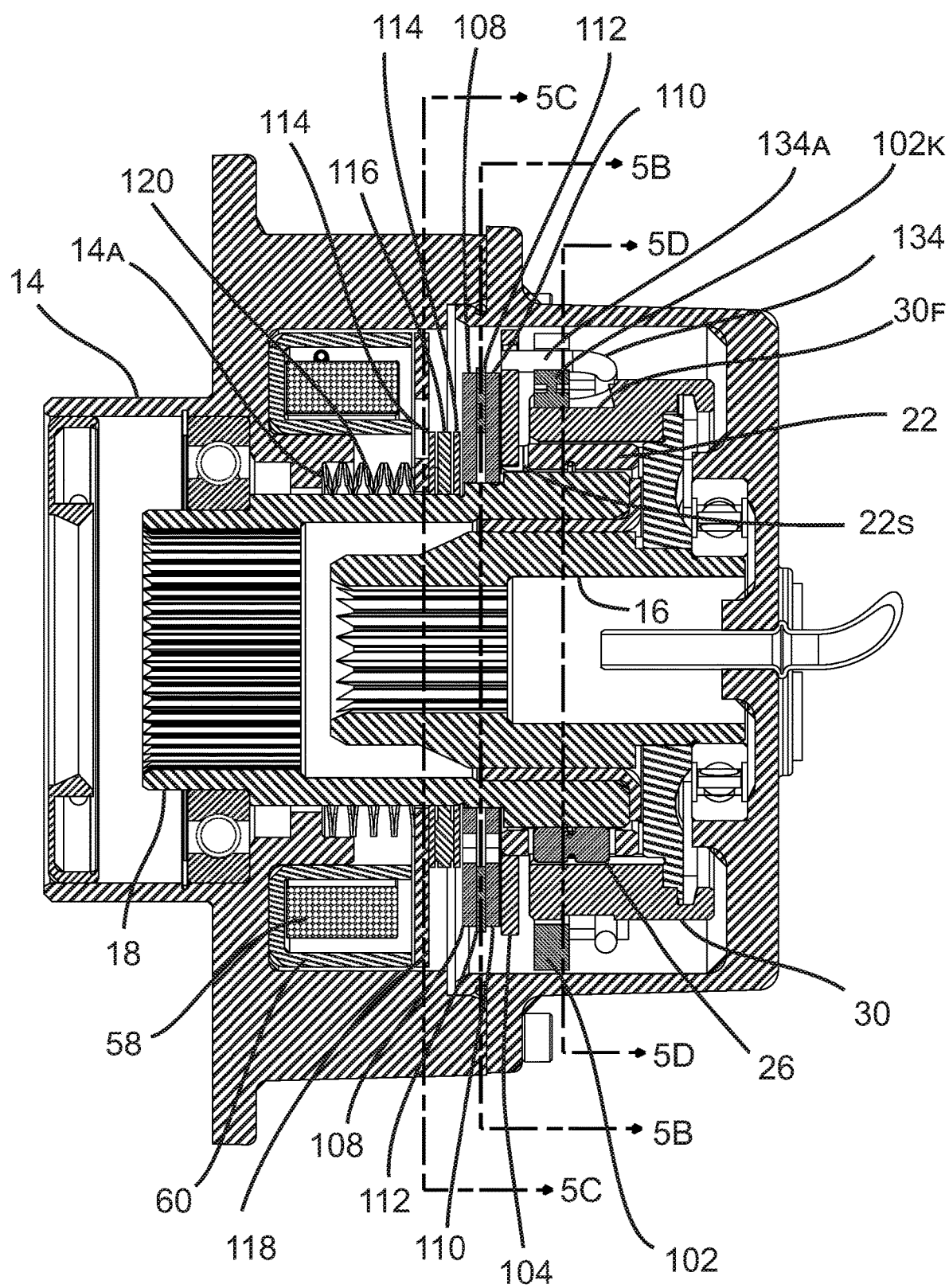
FIG. 5A is a cross-sectional view of the second embodiment of the coupling shown in FIG. 5 taken along lines 5A-5A.
Figure 6B:
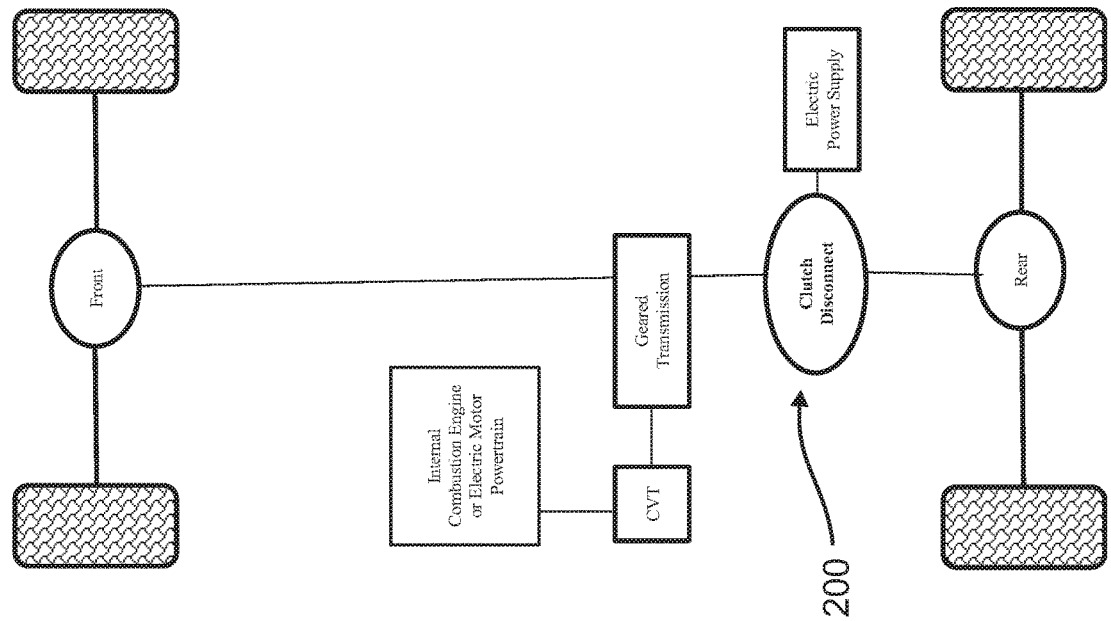
FIGS. 6A-6H illustrate embodiments of the coupling for providing controlled connectivity between various drivetrain components.
Figure 6A:
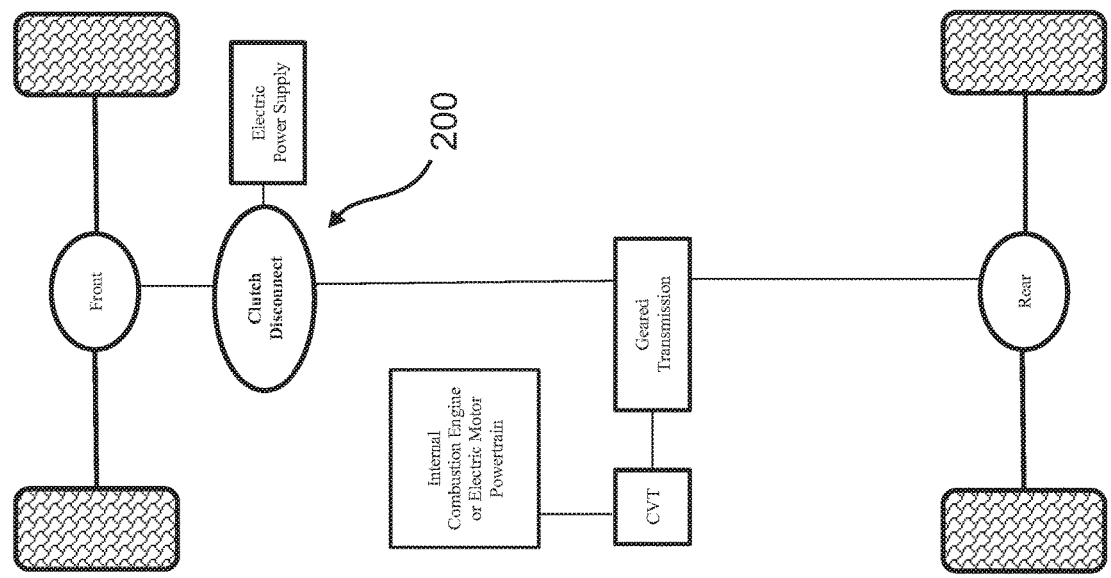
Figure 6D:
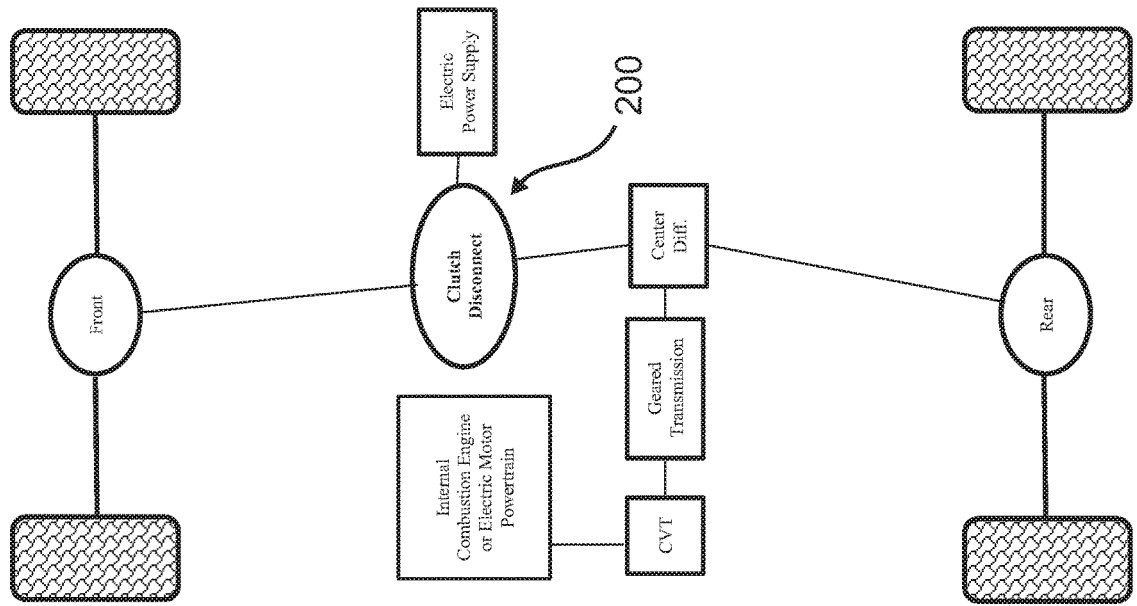
Figure 6C:
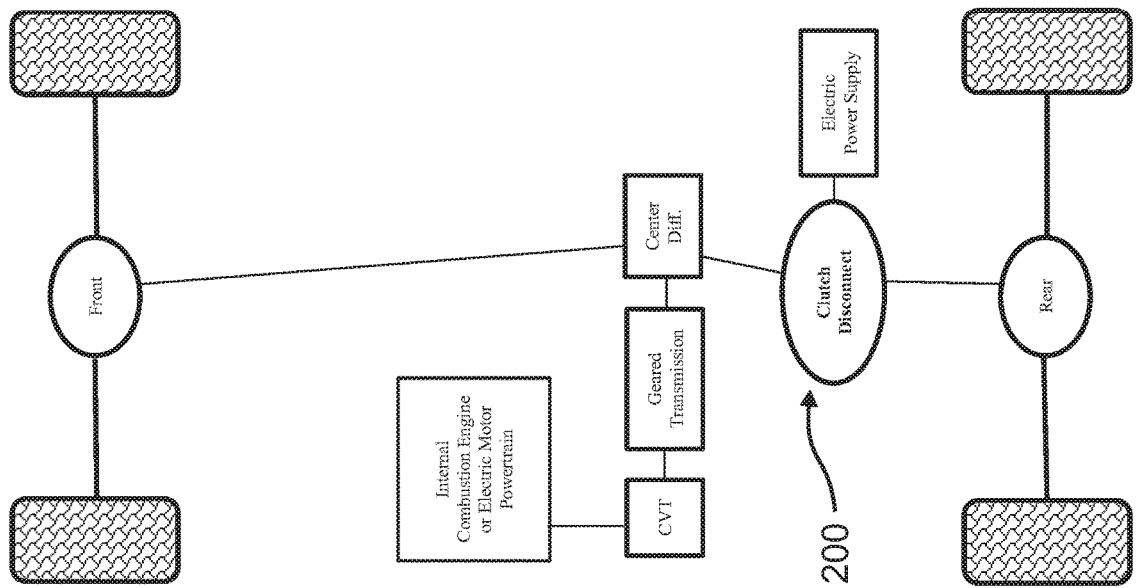
Figure 6F:
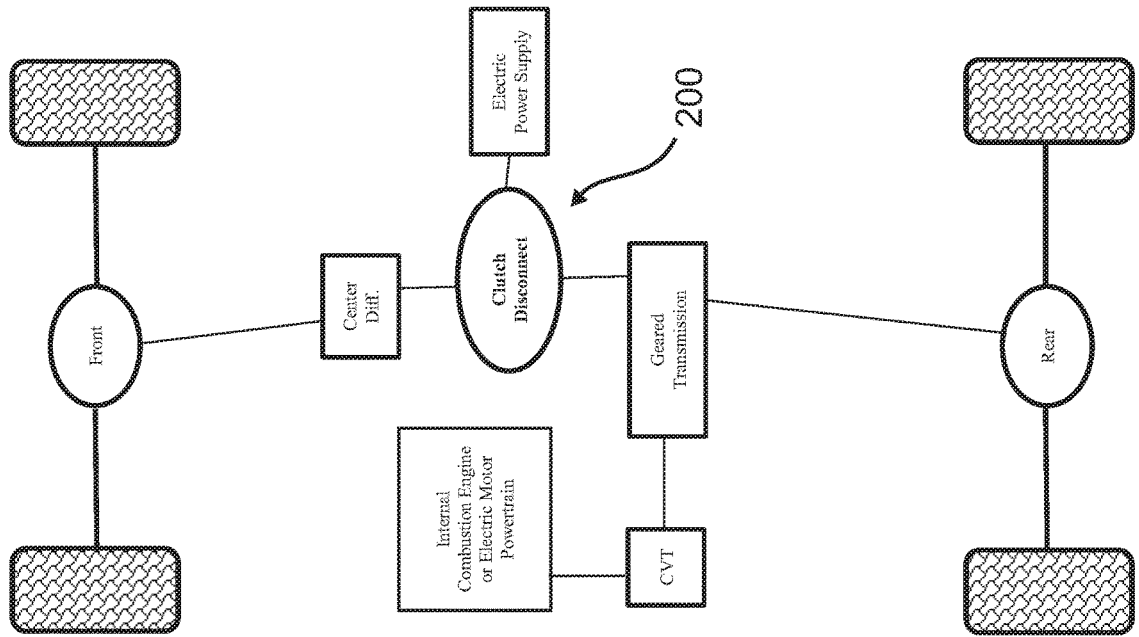
Figure 6E:
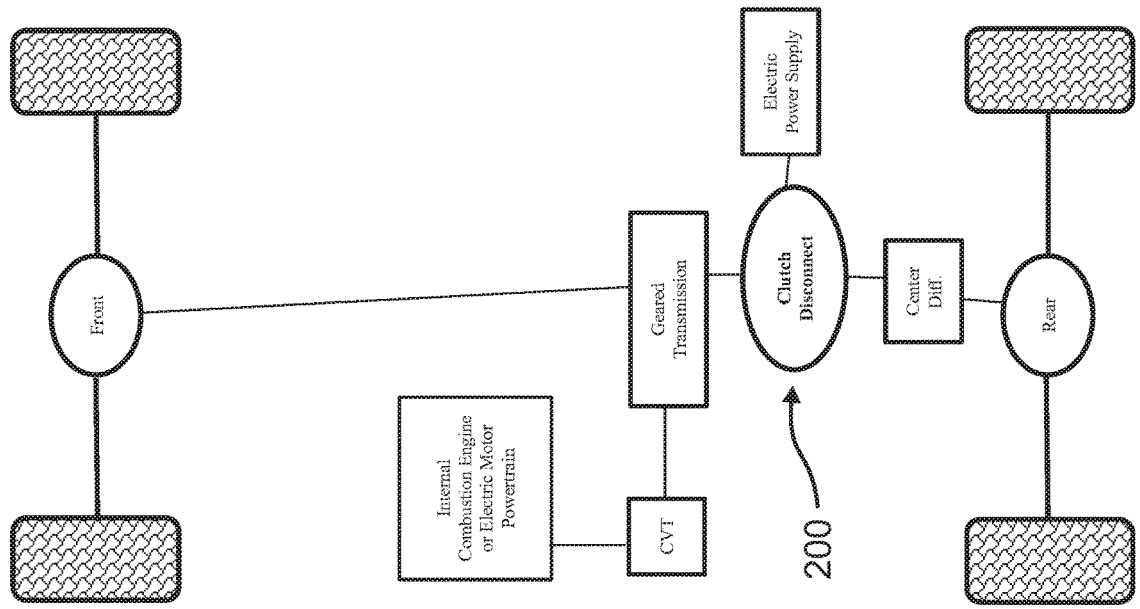
Figure 6H:
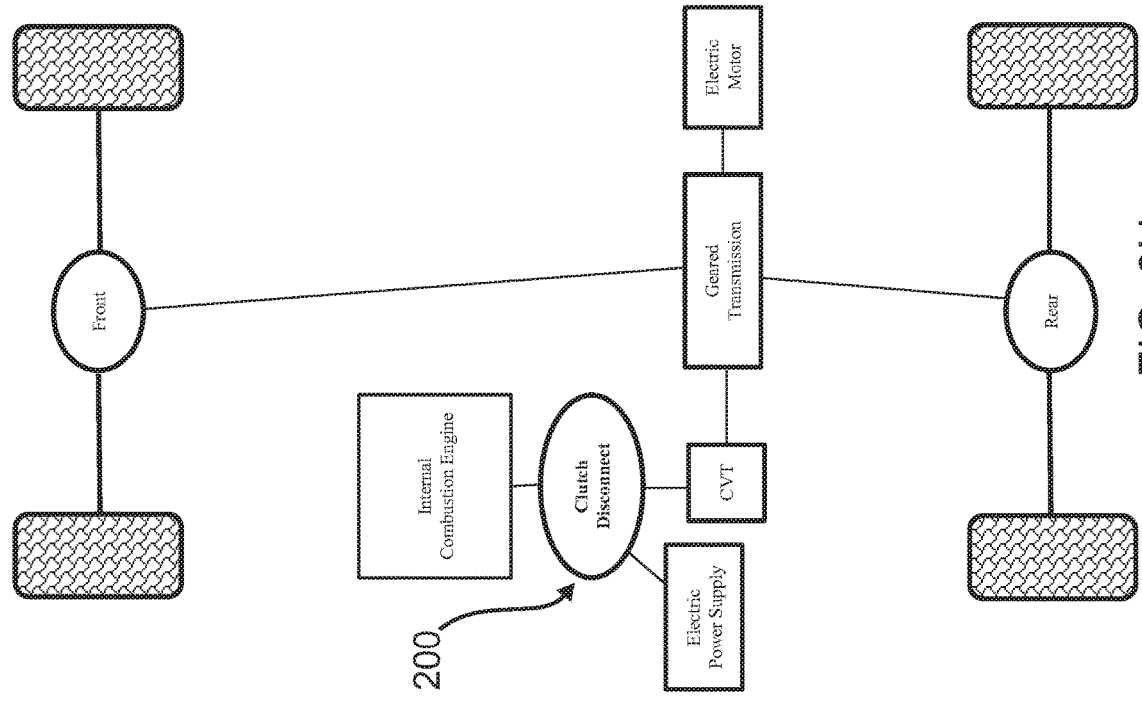
Figure 6G:
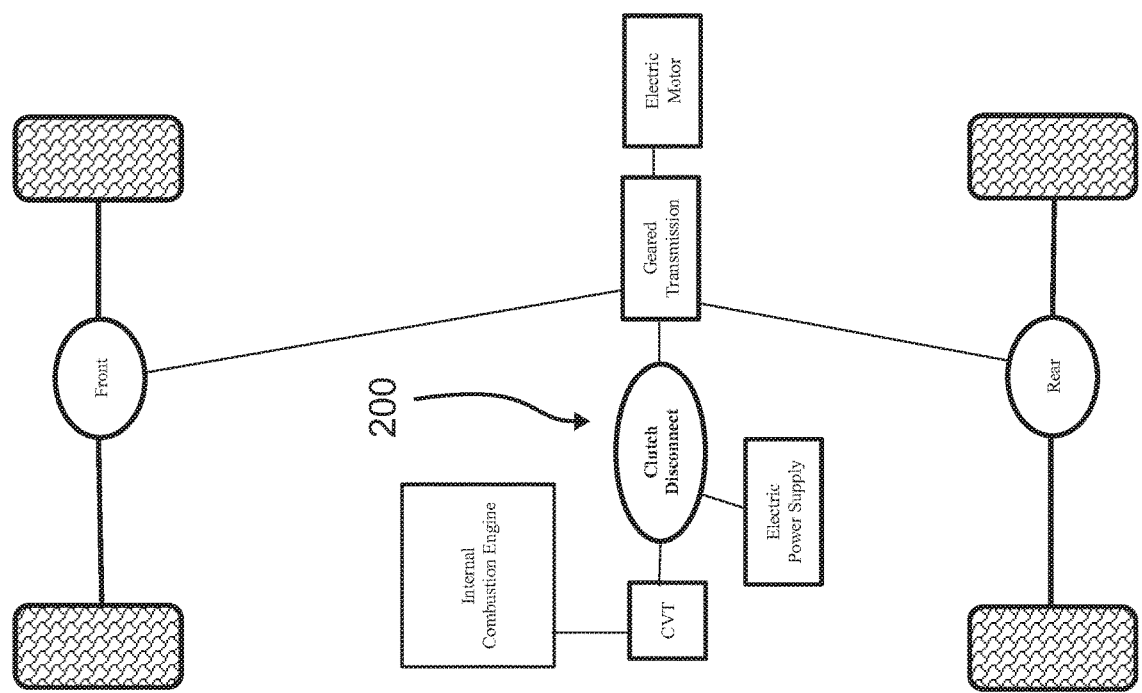

Adjacent to the clutch pack 106 are two thrust washers 114 separated by a needle bearing 116. The thrust washers 114 and needle bearing 116 are disposed about a portion of the output shaft 18 and are compressed against the clutch pack 106 and held in place by an actuator or armature plate 118. The armature plate 118 is attached to the cover 14 such that the armature plate 118 does not rotate. See FIG. 5C which illustrates attachment such as through tabs $118_T$ on the armature plate 118 that engage with notches $14_N$ in the cover. The thrust washers 114 and needle bearing 116 can rotate relative to the armature plate 118 and relative to each other. However, the coefficient of friction between the needle bearing 116 and the thrust washers 114 is lower than the coefficient of friction between the thrust washers 114 and the armature plate 118 and hub plate 108. As a consequence, the needle bearing 116 will rotate relative to the thrust washers 114 while the thrust washers are held stationary against armature plate 118 and hub plate 108. The thrust washers and needle bearing assembly eliminates a wear and friction interface between armature plate 118 and hub plate 108. If the thrust washers and needle bearing assembly were not present then the armature plate 118 and hub plate 108 would rub against on another under the force of the compression spring 120. A portion of the armature plate 118 is positioned adjacent to the coil 58 as shown in FIG. 5A. A locking spring 120 is disposed about a portion of the output shaft 18 and compressed between a flange $14_A$ on the cover 14 and the armature plate 118. The needle bearing 116 provides a low friction surface between the clutch pack 106 and the stationary armature plate 118. The locking spring 120 forces the armature plate 118 into the thrust washers 114 and needle bearing 116 which, in turn, apply axial pressure against the clutch pack 106. The locking spring 120 is preferably a compression spring. As will be discussed below, the compression on the clutch pack 106 retards the rotation of the clutch basket 104 which, due to its connection to the roll cage 22, retards the roll cage 22. The needle bearing provides a low friction interface between the thrust washers. It should be readily apparent that there could be thrust washers and needle bearing interleaved with one another as needed.

Engagement (Locking) of Input and Output Shafts

The engagement of the input and output shafts 16, 18 in this embodiment is provided as follows. During normal operation, the present invention is designed to engage the input shaft 16 with the output shaft 18 such that rotation and torque from the input shaft 16 is transmitted through the coupling to the output shaft 18. The locking spring 120 forces the armature plate 118 into the thrust washers 114 and needle bearing 116 which, in turn, apply pressure against the hub plate 108 of the clutch pack 106. The pressure compresses the cage plate 112 between the hub plates 108, 110. This frictional engagement drags or retards the rotation of the cage plate 112 and the clutch basket 104 (since the cage plate 112 is splined to the clutch basket 104). As discussed above, the clutch basket 104 is connected to the roll cage 22 through tabs. Thus, the dragging of the clutch basket indexes the roll cage 22 so that its rolls 26 wedge between the clutch housing 30 and the output shaft 18. The clutch housing 30 is rotating at the same speed as the input shaft 16 (since it is splined to the input shaft). Accordingly, the clutch housing 30 drives the output shaft 18 to rotate at the same speed.

The inclusion of a low friction interface between the clutch pack 106 and the stationary actuator 118 ensures that the roll cage 22 always indexes into the locked position.

The configuration of this embodiment allows the output shaft 18 to provide backdriving when necessary. Specifically, when the roller clutch is locked (i.e., the rolls are wedged between the clutch housing and the output shaft), the output shaft 18 can drive the rolls into the backdriving cam surfaces as follows. The hub plates 108, 110 are splined to the output shaft 18 with a friction connection between the hub plates 108, 110 and the cage plate 112. When the output shaft 18 rotates faster than the input shaft 16, the hub plates 108, 110 index the cage plate 112 forward which, in turn, caused the clutch basket 104 to index the roll cage 22 forward (opposite the locking position) until the rolls 26 wedge between the backdriving cam surfaces on the clutch housing 30 and the output shaft 18. This transmits torque to the input shaft 16.

Disengagement (Unlocking) of the Input and Output Shafts

When it is desired to disengage the coupling, i.e., unlock the output shaft 18 from the input shaft 16, the electromagnet is energized. As discussed above, a portion of the armature plate 118 is located adjacent to the coil 58 and also adjacent to the locking spring 120. When electrical current is supplied to the coil, the armature plate 118 is pulled into the coil 58. This acts to compress the locking spring 120, thus, removing or reducing compression on the clutch pack 106. At that point, the clutch pack 106 will no longer retard the roll cage 22. The torsion spring 134 biases roll cage 22 into its neutral position (through its connection with the torsion spring retainer 102 and clutch basket 104 as discussed above) where the rolls 26 do not engage the cam surfaces 31 of the clutch housing 30. In this position, the input shaft 16 and output shaft 18 are disconnected from one another and free to rotate independently of each other.

Some of the advantages of the present invention is the ability to carry higher torque in a smaller design envelope. In addition, in prior art friction clutches wear of the friction material can happen due to slipping at engagement or overload. As such, torque capacity of the friction clutch will fade over time due to wear. This leads to a loss of power transmission altogether.

Referring to FIGS. 6A-6H, any of the embodiments of the coupling above have applicability for providing coupling 200 between various drivetrain components, including, as illustrated: (i) rear axle and front axle; (ii) rear differential and front differential; (iii) center differential and rear differential or axle; (iv) center differential and front differential or axle; (v) geared transmission or CVT and front, center or rear differential; (vi) geared transmission or CVT and front or rear axle; (vii) geared transmission or CVT and internal combustion engine; (viii) geared transmission or CVT and electric motor; or (ix) CVT and geared transmission.

As used herein, the term "engage" is intended to both direct physical engagement through one or more components as well as operative engagement.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed. The various embodiments and elements can be interchanged or combined in any suitable manner as necessary.

The use of directions, such as forward, rearward, top and bottom, upper and lower are with reference to the embodiments shown in the drawings and, thus, should not be taken as restrictive. Reversing or flipping the embodiments in the drawings would, of course, result in consistent reversal or flipping of the terminology.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalent.

The invention claimed is:

1. A coupling comprising a housing with a cover;

at least a portion of an input shaft is located in the housing, the input shaft is configured to connect to a first drivetrain component outside of the housing which transmits rotary motion to the input shaft;

at least a portion of an output shaft is located in the housing, the output shaft is configured to connect to a second drivetrain element outside of the housing which is intended to be rotated;

a portion of one of the input and output shaft is inside the other of the input and output shaft and a bearing is located between a portion of an outside diameter of one of the input shaft and output shaft and a portion of an inside diameter of a cavity of the other of the input shaft and output shaft;

a bi-directional roller clutch assembly for selectively connecting and disconnecting the input and output shafts from one another, the roller clutch assembly including a roll cage located inside a clutch housing and configured to rotate relative to the clutch housing, the roll cage having a plurality of slots formed in and spaced about the circumference of the roll cage, a roll is rotatably disposed in each slot, and at least one spring positioned to bias the rolls from moving radially inward in the slots;

the roll cage is positioned about a portion of the output shaft such that the at least one spring biases the rolls away from contact with the output shaft;

the clutch housing having an inner circumference with a contoured cam surface formed on the inner circumference, the cam surface including (i) first contour portions where the rolls are capable of contacting one of either the output shaft or the cam surface but not both so that the output shaft is not rotationally connected to the clutch housing, and (ii) second contour portions where the rolls are capable of contacting both the output shaft and the cam surface so that the output shaft is rotationally connected to the clutch housing through the roller clutch assembly for transmitting torque between the clutch housing and the output shaft;

a drive plate disposed about and attached to a portion of the input shaft so as to rotate in combination therewith, the drive plate rotationally connected to the clutch housing such that rotation of the input shaft produces corresponding rotation of the clutch housing;

a torsion spring and a spring retainer, the torsion spring being positioned within the spring retainer and engaged with at least one of either the spring retainer or the clutch housing; and an engagement control assembly for controlling the engagement and disengagement of the bi-directional roller clutch assembly comprising an electromechanical device including a coil housing mounted in the cover and an electromagnetic coil mounted in the coil housing, the coil is connected to a switch for controlling the supply of current to the coil, the coil having an active state when power is sent to the coil, the coil generating a magnetic flux in the active state, and an inactive state when no power is sent to the coil and no magnetic flux is generated, and at least one armature plate disposed about the output shaft and positioned near the coil, the at least one armature plate providing a connection between the output shaft and the torsion spring when the coil is activated.

2. The coupling of claim 1, wherein the input shaft is a stub shaft and includes internal splines that engage with a drive shaft, the drive shaft is connected to the first drivetrain component which transmits rotary motion to the drive shaft and, in turn, the input shaft.

3. The coupling of claim 1, wherein each second contour portion of the cam surface is located adjacent to one of the first contour portions and angles away from the first contour portion toward the output shaft.

4. The coupling of claim 1, wherein there is one second contour portion located on either side of each first contour portion, with each of those second contour portions angling away from the first contour portion and from each other, and wherein one of the second contour portions provides a wedging surface for the associated roll during normal torque transmission from the input shaft to the output shaft, and the other of the second contour portions provides a wedging surface for the associated roll during backdriving for transmitting torque from the output shaft to the input shaft.

5. The coupling of claim 1, wherein the drive plate has an outer periphery with at least one tab or spline that engages with a mating recess or spline formed on the clutch housing to provide the rotational connection between the drive plate and the clutch housing.

6. The coupling of claim 1, wherein in the torsion spring is engaged with both the spring retainer and the clutch housing, wherein the roll cage is connected to the spring retainer so that the spring retainer and roll cage rotate in combination.

7. The coupling of claim 6, wherein the torsion spring retainer is connected to the clutch housing so that the spring retainer rotates in combination with the clutch housing.

8. The coupling of claim 7, wherein the torsion spring has a shape that is slightly larger than a complete circle so that the spring ends overlap with two arms that extend radially inward, the arms form a gap, a clutch pin is attached to and protrudes laterally outward from a face of the clutch housing toward the spring retainer and extends into the gap with the arms on either side of the clutch pin, a retainer pin extends laterally outward from a side of the spring retainer and into the gap adjacent to the clutch pin with the arms on either side of the retainer pin.

9. The coupling of claim 8, wherein the arms of the torsion spring bias the roll cage and clutch housing to their respective neutral position relative to one another, wherein when either the clutch housing or the spring retainer rotate relative to the other, each of the pins bear against one of the arms causing the arms to move apart and the torsion spring to deflect, which causes the torsion spring to act against the rotation, attempting to return the arms to their neutral position.

10. The coupling of claim 1, wherein the at least one armature plate comprises a first armature plate and a second armature plate, the first armature plate is connected to the spring retainer such that the first armature plate rotates with the spring retainer and the second armature plate is connected to the output shaft such that the second armature plate rotates in combination with the output shaft, and wherein the magnetic flux generated by the coil when in its active state attracts the first armature plate to the second armature plate;

wherein in the active state, the magnetic attraction of the first armature plate to the second armature plate results in a connection from the input shaft, through the drive plate, the clutch housing, the torsion spring, the spring retainer, the first armature plate, and the second armature plate to the output shaft;

wherein if the input shaft is rotating faster than the output shaft while the coil is in its active state, the slower rotating output shaft and second armature plate will magnetically drag the first armature plate, causing the spring retainer to rotate relative to the input shaft and index the roll cage into an engaged position where the rolls wedge between the inner contour of the clutch housing and the outer surface of the output shaft; and wherein if the output shaft is rotating faster than the input shaft while the coil is in its activate state, the second armature plate will be turning faster than the first armature plate, the magnetic force and friction acting between the two armature plates causes the second armature plate to rotate the first armature plate which rotates the spring retainer relative to the input shaft causing the torsion spring to deflect and rotate the roll cage changing the relative position of the rolls relative to the contoured inner surface and the input shaft, thus causing the rolls to engage the contoured inner surface thereby locking the output shaft to the input shaft so as to transmit torque from the output shaft to the input shaft.

11. The coupling of claim 10, wherein the first armature plate has one or more tabs that engage with slots formed in the torsion spring retainer and extend into slots formed in the roll cage, thereby connecting the roll cage to the first armature plate and the torsion spring retainer so that they all rotate in combination, and wherein the second armature plate is splined onto the output shaft, and wherein the second armature plate includes one or more slotted openings to permit magnetic flux to pass through to the first armature plate.

12. A coupling comprising:
a housing with a cover;
at least a portion of an input shaft is located in the housing, the input shaft is configured to connect to a first drivetrain component outside of the housing which transmits rotary motion to the input shaft;
at least a portion of an output shaft is located in the housing, the output shaft is configured to connect to a second drivetrain element outside of the housing which is intended to be rotated;
a portion of one of the input and output shaft is inside the other of the input and output shaft and a bearing is located between a portion of an outside diameter of one of the input shaft and output shaft and a portion of an inside diameter of a cavity of the other of the input shaft and output shaft;
a bi-directional roller clutch assembly for selectively connecting and disconnecting the input and output shafts from one another, the roller clutch assembly including a roll cage located inside a clutch housing and configured to rotate relative to the clutch housing, the roll cage having a plurality of slots formed in and spaced about the circumference of the roll cage, a roll is rotatably disposed in each slot, and at least one spring positioned to bias the rolls from moving radially inward in the slots;
the roll cage is positioned about a portion of the output shaft such that the at least one spring biases the rolls away from contact with the output shaft;
the clutch housing having an inner circumference with a contoured cam surface formed on the inner circumference, the cam surface including (i) first contour portions where the rolls are capable of contacting one of either the output shaft or the cam surface but not both so that the output shaft is not rotationally connected to the clutch housing, and (ii) second contour portions where the rolls are capable of contacting both the output shaft and the cam surface so that the output shaft is rotationally connected to the clutch housing through the roller clutch assembly;

a drive plate disposed about and attached to a portion of the input shaft so as to rotate in combination therewith, the drive plate rotationally connected to the clutch housing such that rotation of the input shaft produces corresponding rotation of the clutch housing;

a torsion spring and a spring retainer, the torsion spring being positioned within the spring retainer and engaged with at least one of either the spring retainer or the clutch housing; and an engagement control assembly for controlling the engagement and disengagement of the bi-directional roller clutch assembly comprising an electromechanical device including a coil housing mounted in the cover and an electromagnetic coil mounted in the coil housing, the coil is connected to a switch for controlling the supply of current to the coil, the coil having an active state when power is sent to the coil, the coil generating a magnetic flux in the active state, and an inactive state when no power is sent to the coil and no magnetic flux is generated, and at least one armature plate disposed about the output shaft and positioned near the coil, the at least one armature plate providing a connection between the output shaft and the torsion spring when the coil is activated;

wherein the at least one armature plate is a single armature plate, the armature plate attached to the cover so as to be fixed relative to the output shaft;

wherein a clutch basket is disposed about a portion of the roll cage and adjacent to one face of the clutch housing, the clutch basket includes tabs extending radially inward which engage with mating slots in the roll cage so that the clutch basket and roll cage rotate in combination; and wherein the spring retainer is attached to the clutch housing such that the torsion spring and clutch basket function to bias the roll cage into its neutral position relative to the clutch housing.

13. The coupling of claim 12, wherein the torsion spring has a shape that is slightly less than a complete circle with two arms extending laterally away from a body of the torsion spring and substantially parallel to one another, the arms extending through a slot in the spring retainer when the torsion spring is located inside the spring retainer, and through a slot in the clutch basket, and wherein when one of either the clutch basket or the spring retainer rotates relative to the other, the slot in the clutch basket causes one of the arms of the torsion spring to move relative to the other of the other arm thereby deflecting the torsion spring.

14. The coupling of claim 12, further comprising a clutch pack for providing an interconnection between the clutch basket and the output shaft, the clutch pack having at least two hub plates that are disposed about and engaged with the output shaft such that the hub plates rotate in combination with the output shaft, and a cage plate located between the at least two hub plates, the cage plate rotatable relative to the output shaft, the cage plate having notches that engage with tabs that project from one side of the clutch basket such that the cage plate rotates in combination with the clutch basket.

15. The coupling of claim 14, wherein the hub plates are splined to the output shaft though one or more flat surfaces formed on the inner circumference of the hub plates that mate with corresponding flat surfaces formed on the outer circumference of a portion of the output shaft.

16. The coupling of claim 14, further comprising at least two thrust washers spaced apart by a needle bearing, the thrust washers and needle bearing being disposed about a portion of the output shaft and compressed against one of the hub plates of the clutch pack by the armature plate, wherein the thrust washers and needle bearing can rotate relative to the armature plate and relative to each other, a coefficient of friction between the needle bearing and the thrust washers is lower than a coefficient of friction between the thrust washers and the armature plate and hub plate such that the needle bearing will rotate relative to the thrust washers while the thrust washers are held stationary against armature plate and hub plate.

17. The coupling of claim 14, further comprising a locking spring disposed about a portion of the output shaft and compressed between a portion of the cover and the armature plate, wherein the locking spring urges the armature plate into the thrust washers and needle bearing which, in turn, apply axial pressure against the clutch pack, wherein the pressure on the clutch pack retards rotation of the clutch basket which, due to its connection to the roll cage, retards the roll cage.

18. A coupling comprising
a housing with a cover;
at least a portion of an input shaft is located in the housing, the input shaft is configured to connect to a first drivetrain component outside of the housing which transmits rotary motion to the input shaft;
at least a portion of an output shaft is located in the housing, the output shaft is configured to connect to a second drivetrain element outside of the housing which is intended to be rotated;
a portion of one of the input shaft and output shaft is located within an internal cavity of the other of the input shaft and output shaft and a bearing is located between the input shaft and the output shaft so as to permit one to rotate relative to the other;
a bi-directional roller clutch assembly for selectively connecting and disconnecting the input and output shafts from one another, the roller clutch assembly including a roll cage located inside a clutch housing and configured to rotate relative to the clutch housing, the roll cage having a plurality of slots formed in and spaced about the circumference of the roll cage, a roll is rotatably disposed in each slot, and at least one spring positioned to bias the rolls from moving radially inward in the slots;
the roll cage is positioned about a portion of the output shaft such that the at least one spring biases the rolls away from contact with the output shaft;
the clutch housing having an inner circumference with a contoured cam surface formed on the inner circumference, the cam surface including (i) first contour portions where the rolls are capable of contacting one of either the output shaft or the cam surface but not both so that the output shaft is not rotationally connected to the clutch housing, and (ii) second contour portions where the rolls are capable of contacting both the output shaft and the cam surface so that the output shaft is rotationally connected to the clutch housing through the roller clutch assembly;

a drive plate disposed about and attached to a portion of the input shaft so as to rotate in combination therewith, the drive plate rotationally connected to the clutch housing such that rotation of the input shaft produces corresponding rotation of the clutch housing;

a torsion spring and a spring retainer, the torsion spring is positioned within the spring retainer and engaged with both the spring retainer or the clutch housing, so that the torsion spring retainer rotates in combination with the clutch housing, wherein the roll cage is connected to the spring retainer so that the spring retainer and roll cage rotate in combination, the torsion spring having a shape that is slightly larger than a complete circle so that the spring ends overlap with two arms that extend radially inward, the arms form a gap, a clutch pin is attached to and protrudes laterally outward from a face of the clutch housing toward the spring retainer and extends into the gap with the arms on either side of the clutch pin, a retainer pin extends laterally outward from a side of the spring retainer and into the gap adjacent to the clutch pin with the arms on either side of the retainer pin, wherein the arms of the torsion spring bias the roll cage and clutch housing to their respective neutral position relative to one another, wherein when either the clutch housing or the spring retainer rotate relative to the other, each of the pins bear against one of the arms causing the arms to move apart and the torsion spring to deflect, which causes the torsion spring to act against the rotation, attempting to return the arms to their neutral position;

an engagement control assembly for controlling the engagement and disengagement of the bi-directional roller clutch assembly comprising an electromechanical device including a coil housing mounted in the cover and an electromagnetic coil mounted in the coil housing, the coil is connected to a switch for controlling the supply of current to the coil, the coil having an active state when power is sent to the coil, the coil generating a magnetic flux in the active state, and an inactive state when no power is sent to the coil and no magnetic flux is generated, and a first armature plate and a second armature plate, the first armature plate has one or more tabs that engage with slots formed in the spring retainer and extend into slots formed in the roll cage, thereby connecting the roll cage to the first armature plate and the torsion spring retainer so that they all rotate in combination, the second armature plate being splined onto the output shaft such that the second armature plate rotates in combination with the output shaft, and wherein the magnetic flux generated by the coil when in its active state attracts the first armature plate to the second armature plate;

wherein in the active state, the magnetic attraction of the first armature plate to the second armature plate results in a connection from the input shaft, through the drive plate, the clutch housing, the torsion spring, the spring retainer, the first armature plate, and the second armature plate to the output shaft;

wherein if the input shaft is rotating faster than the output shaft while the coil is in its active state, the slower rotating output shaft and second armature plate will magnetically drag the first armature plate, causing the spring retainer to rotate relative to the input shaft and index the roll cage into an engaged position where the rolls wedge between the inner contour of the clutch housing and the outer surface of the output shaft; and wherein if the output shaft is rotating faster than the input shaft while the coil is in its activate state, the second armature plate will be turning faster than the first armature plate, the magnetic force and friction acting between the two armature plates causes the second armature plate to rotate the first armature plate which rotates the spring retainer relative to the input shaft causing the torsion spring to deflect and rotate the roll cage changing the relative position of the rolls relative to the contoured inner surface and the input shaft, thus causing the rolls to engage the contoured inner surface thereby locking the output shaft to the input shaft so as to transmit torque from the output shaft to the input shaft.

19. A coupling comprising a housing with a cover;

at least a portion of an input shaft is located in the housing, the input shaft is configured to connect to a first drivetrain component outside of the housing which transmits rotary motion to the input shaft;

at least a portion of an output shaft is located in the housing, the output shaft is configured to connect to a second drivetrain element outside of the housing which is intended to be rotated;

a portion of one of the input shaft and output shaft is located within an internal cavity of the other of the input shaft and output shaft and a bearing is located between the input shaft and the output shaft so as to permit one to rotate relative to the other;

a bi-directional roller clutch assembly for selectively connecting and disconnecting the input and output shafts from one another, the roller clutch assembly including a roll cage located inside a clutch housing and configured to rotate relative to the clutch housing, the roll cage having a plurality of slots formed in and spaced about the circumference of the roll cage, a roll is rotatably disposed in each slot, and at least one spring positioned to bias the rolls from moving radially inward in the slots;

the roll cage is positioned about a portion of the output shaft such that the at least one spring biases the rolls away from contact with the output shaft;

the clutch housing having an inner circumference with a contoured cam surface formed on the inner circumference, the cam surface including (i) first contour portions where the rolls are capable of contacting one of either the output shaft or the cam surface but not both so that the output shaft is not rotationally connected to the clutch housing, and (ii) second contour portions where the rolls are capable of contacting both the output shaft and the cam surface so that the output shaft is rotationally connected to the clutch housing through the roller clutch assembly;

a drive plate disposed about and attached to a portion of the input shaft so as to rotate in combination therewith, the drive plate rotationally connected to the clutch housing such that rotation of the input shaft produces corresponding rotation of the clutch housing;

a torsion spring and a spring retainer, the torsion spring being positioned within the spring retainer and engaged with the spring retainer, the torsion spring having a shape that is slightly less than a complete circle with two arms extending laterally away from a body of the torsion spring and substantially parallel to one another, the arms extending through a slot in the spring retainer and through a slot in a clutch basket, and wherein when one of either the clutch basket or the spring retainer rotates relative to the other, the slot in the clutch basket causes one of the arms of the torsion spring to move relative to the other of the other arm thereby deflecting the torsion spring;

an engagement control assembly for controlling the engagement and disengagement of the bi-directional roller clutch assembly comprising an electromechanical device including a coil housing mounted in the cover and an electromagnetic coil mounted in the coil housing, the coil is connected to a switch for controlling the supply of current to the coil, the coil having an active state when power is sent to the coil, the coil generating a magnetic flux in the active state, and an inactive state when no power is sent to the coil and no magnetic flux is generated, and an armature plate disposed about the output shaft and positioned near the coil, the armature plate attached to the cover so as to be fixed relative to the output shaft;

the clutch basket is disposed about a portion of the roll cage and adjacent to one face of the clutch housing, the clutch basket includes tabs extending radially inward which engage with mating slots in the roll cage so that the clutch basket and roll cage rotate in combination, and wherein the torsion spring retainer is attached to the clutch housing such that the torsion spring and clutch basket function to bias the roll cage into its neutral position relative to the clutch housing;

a clutch pack for providing an interconnection between the clutch basket and the output shaft, the clutch pack having at least two hub plates that are disposed about and engaged with the output shaft such that the hub plates rotate in combination with the output shaft, and a cage plate located between the at least two hub plates, the cage plate rotatable relative to the output shaft, the cage plate having notches that engage with tabs that project from one side of the clutch basket such that the cage plate rotates in combination with the clutch basket;

at least two thrust washers spaced apart by a needle bearing, the thrust washers and needle bearing being disposed about a portion of the output shaft and compressed against one of the hub plates of the clutch pack by the armature plate, wherein the thrust washers and needle bearing can rotate relative to the armature plate and relative to each other, a coefficient of friction between the needle bearing and the thrust washers is lower than a coefficient of friction between the thrust washers and the armature plate and hub plate such that the needle bearing will rotate relative to the thrust washers while the thrust washers are held stationary against armature plate and hub plate; and a locking spring disposed about a portion of the output shaft and compressed between a portion of the cover and the armature plate, wherein the locking spring urges the armature plate into the thrust washers and needle bearing which, in turn, apply axial pressure against the clutch pack, wherein the pressure on the clutch pack retards rotation of the clutch basket which, due to its connection to the roll cage, retards the roll cage.

* * * * *